(12) United States Patent
Hwang et al.

(10) Patent No.: US 9,905,873 B2
(45) Date of Patent: Feb. 27, 2018

(54) PERMEABLE METAL SUBSTRATE, METAL-SUPPORTED SOLID OXIDE FUEL CELL AND THEIR MANUFACTURING METHODS

(71) Applicant: Institute of Nuclear Energy Research, Atomic Energy Council, Executive Yuan, R.O.C., Taoyuan (TW)

(72) Inventors: Chang-Sing Hwang, Taoyuan (TW); Chun-Huang Tsai, Taoyuan (TW); Chun-Liang Chang, Taoyuan (TW); Zong-Yang Chuang Shie, Taoyuan (TW); Sheng-Fu Yang, Taoyuan (TW); Te-Jung Huang, Taoyuan (TW); Ming-Hsiu Wu, Taoyuan (TW); Jing-Kai Lin, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 49 days.

(21) Appl. No.: 15/214,701

(22) Filed: Jul. 20, 2016

(65) Prior Publication Data

US 2017/0125833 A1     May 4, 2017

(30) Foreign Application Priority Data

Nov. 3, 2015 (TW) .............................. 104136183 A

(51) Int. Cl.
*H01M 8/1226* (2016.01)
*H01M 8/0271* (2016.01)
*H01M 8/126* (2016.01)
*H01M 8/0236* (2016.01)
*H01M 8/1286* (2016.01)
*H01M 8/124* (2016.01)

(52) U.S. Cl.
CPC ....... *H01M 8/1226* (2013.01); *H01M 8/0236* (2013.01); *H01M 8/0271* (2013.01); *H01M 8/126* (2013.01); *H01M 8/1286* (2013.01); *H01M 2008/1293* (2013.01)

(58) Field of Classification Search
CPC .......................... H01M 8/1226; H01M 8/0271
See application file for complete search history.

(56) References Cited

U.S. PATENT DOCUMENTS

2006/0197264 A1* 9/2006 Cutler ................. H01M 4/8621
264/618

* cited by examiner

*Primary Examiner* — Olatunji Godo
(74) *Attorney, Agent, or Firm* — Locke Lord LLP; Tim Tingkang Xia, Esq.

(57) ABSTRACT

The invention provides a permeable metal substrate and its manufacturing method. The permeable metal substrate includes a substrate body and a permeable powder layer. The permeable powder layer is located on the top of the substrate body. The substrate body can be a thick substrate or formed of a thick substrate and a thin substrate that are welded together. Both the thick and thin substrates have a plurality of permeable straight gas channels. In addition, a metal-supported solid oxide fuel cell and its manufacturing method are also provided.

23 Claims, 16 Drawing Sheets

PERMEABLE METAL SUBSTRATE, METAL-SUPPORTED SOLID OXIDE FUEL CELL AND THEIR MANUFACTURING METHODS

CROSS REFERENCE TO RELATED APPLICATION

This application also claims priority to Taiwan Patent Application No. 104136183 filed in the Taiwan Patent Office on Nov. 3, 2015, the entire content of which is incorporated herein by reference.

FIELD OF THE INVENTION

The present invention relates to a substrate, a fuel cell and the manufacturing methods thereof, and more particularly to a permeable metal substrate, a metal-supported fuel cell and their manufacturing methods.

BACKGROUND OF THE INVENTION

A solid oxide fuel cell (SOFC) is an electrochemical conversion device that produces electricity directly from oxidizing a fuel. Generally, a ceramic material of yttria stabilized zirconia (YSZ) is commonly being in SOFC as electrolyte, while a material of Ni-YSZ ceramic is the anode material of choice and a material of $LaMnO_3$ is the cathode material.

It is noted that a conventional SOFC generally uses a cement anode material to construct its support element, whereas the more recent metal-supported SOFC is designed with a permeable metal layer to be its support element. However, no matter the support element is made of a cement anode material or is made of a permeable metal, it can be the thickest layer in each individual cell and is generally about 0.5~1.5 mm in thickness and 5×5~20×20 $cm^2$ in size. Although a thick layer of support element can provide good mechanical support, the permeability of such support element can be poor that not only it may be difficult for hydrogen to enter the anode layer, but also a water vapor byproduct generated from the electrochemical reaction at the anode layer may not be drained out of anode layer easily. Moreover, if the water vapor byproduct is not being drained out of the anode layer in time, the path allowing hydrogen to be guided into the anode layer can be blocked, resulting a great polarization voltage drop on the anode side, such as a polarization loss in concentration gradient, which is going to further affect the performance of the SOFC.

Current SOFCs usually are built with comparatively thinner anode layer, cathode layer and electrolyte layer for reducing the polarization losses and ohmic losses in electrodes and electrolyte respectively. Thus, it is generally required to have a support element to be designed in the fuel cell structure. However, a SOFC with thick support element may have good mechanical support, but can be poor in permeability that results in low cell output.

Although the permeability of the support element in SOFCs can be improved simply by reducing the thickness of the support element, it is noted that the strength of the support element may be weakened correspondingly, and consequently the long-term operation stability of the cell structure can be adversely affected.

Conventionally, a permeable metal substrate is formed of stacking granular powders by powder metallurgy, and the binding between granular powders is achieved by a pressing process and a high temperature sintering process so as to form a permeable metal substrate with sufficient mechanical strength while allowing pores to exist between granular powders for providing permeability. However, since the stacking of the granular powders is disorderly, irregular and uncontrollable, the gas channels formed by the connection between pores between granular powders can be irregular and tortuous. Consequently, such tortuous gas channels are not good for gas flows, including hydrogen and water vapor flows.

In addition, as the sizes of the pores that are being formed between granular powders are also uncontrollable, the sizes of the gas channels that are the direct result of serially connected pores are also uncontrollable. Consequently, such tortuous gas channels that are formed with connecting the varying pore sizes may be the cause of resistances to the hydrogen and water vapor flows in the fuel cell, resulting that not only it may be difficult for hydrogen to enter the anode layer, but also the water vapor byproduct generated from the electrochemical reaction at the anode layer may not be drained out of anode layer easily.

According to the foregoing description, it is noted that the tortuous gas channels that are formed of varying pore sizes may also cause the corresponding permeable metal substrate to have low permeability and the substrates manufactured by the same process have varying magnitudes of permeability. Therefore, the output powers of fuel cells that use the aforesaid permeable metal substrates as their support elements may be various too.

Moreover, since the mechanical strength of permeable metal substrate is determined by the binding strength between the stacking granular powders, and the necking portions between granular powders can most often be exposed in the environment of manufacturing process or to the cell working environment where the metallic properties of substrates can be changed due to the chemical transformation or oxidization of the necking portions, this results in causing the whole metal substrate to become brittle, unable to bear impact or thermal shock, and therefore unable to produce functional layers in the SOFCs, so that the materials of stacking granular powders should be carefully selected to have enough resistances to this chemical transformation or oxidization.

SUMMARY OF THE INVENTION

The present invention provides a permeable metal substrate and the manufacturing method thereof, in which not only hydrogen and water vapor byproduct can be transmitted smoothly by the permeable metal substrate, but also the permeable metal substrate is designed with an expansion coefficient matching enough to that of the electrolyte used in the SOFC for facilitating the manufacturing of the functional layers of the metal-supported SOFC on the permeable metal substrate.

The present invention provides a metal-supported SOFC, which adopts a permeable metal substrate with an expansion coefficient matching enough to that of the electrolyte used in the SOFC for assisting thermal cycling and rapid startup, and is formed with a porous anode layer with micron and sub-micron structures for improving the fuel diffusion in the anode as well as the fuel efficiency in the anode. In an embodiment, an anode material with the above structure and satisfactory adhesive strength between anode particles formed of the anode is deposited on the prepared permeable metal substrate for enhancing the binding strengths in the anode and between the anode and the metal substrate, thus the whole anode strength of the resulting SOFC is increased.

The present invention provides a method for manufacturing a metal-supported SOFC, by which not only hydrogen and water vapor byproduct can be transmitted smoothly in the metal-supported SOFC and a laser drilling means is adopted for allowing the metal-supported SOFC to be mass produced and reducing the manufacturing cost.

In an embodiment, the present invention provides a permeable metal substrate, which comprises: a substrate body, and a permeable powder layer. The substrate body can be a thick substrate, which is substantially a metallic interconnect used in a SOFC after being perforated by a laser drilling process. The thick substrate is further formed with a plurality of permeable straight gas channels; and the permeable powder layer is located on the top of the substrate body.

In another embodiment, the present invention provides another permeable metal substrate, which comprises: a substrate body, and a permeable powder layer. The substrate body is formed of a thick substrate and a thin substrate that are welded together by a high temperature brazing process in vacuum or reducing environment. The thick substrate and the thin substrate are respectively formed of a thick metallic interconnect and a thin metallic interconnect that are being perforated by a laser drilling process. In addition, the thick substrate is further formed with a plurality of permeable straight first gas channels and the thin substrate is formed with a plurality of permeable straight second gas channels, while the thin substrate is disposed on the thick substrate. Moreover, the permeable powder layer is located on the top of the thin substrate of the substrate body.

In another embodiment, the present invention provides a metal-supported solid oxide fuel cell (SOFC), which comprises: a permeable metal substrate, a porous anode layer, a dense anode isolation layer, a dense electrolyte layer, a dense cathode isolation layer and a porous cathode layer. The permeable metal substrate includes a substrate body and a permeable powder layer, in which the substrate body can be a thick substrate or formed of a thick substrate and a thin substrate that are welded together by a high temperature brazing process. In addition, the thick substrate and the thin substrate are respectively formed of a thick metallic interconnect and a thin metallic interconnect that are being perforated by a laser drilling process. In this embodiment, the thick substrate is further formed with a plurality of permeable straight first gas channels and the thin substrate is formed with a plurality of permeable straight second gas channels, while the thin substrate is disposed on the thick substrate. The porous anode layer is disposed on the permeable powder layer of the permeable metal substrate. The dense anode isolation layer is disposed on the porous anode layer. The dense electrolyte layer is disposed on the dense anode isolation layer. The dense cathode isolation layer is disposed on the dense electrolyte layer. The porous cathode layer is disposed on the dense cathode isolation layer.

In another embodiment, the present invention provides a method for manufacturing a metal-supported SOFC, which comprises the steps of: providing a substrate body, while allowing the substrate body to be either a thick substrate or formed of a thick substrate and a thin substrate that are welded together by brazing; when the substrate body is formed of a thick substrate and a thin substrate, using a drilling process, such as a laser drilling process, to form respectively a plurality of permeable straight first gas channels on the thick substrate and a plurality of permeable straight second gas channels on the thin substrate; forming a permeable powder layer on the substrate body; reducing the surface pore size of the permeable powder layer to be smaller than 30 µm so as to form a permeable metal substrate that can be coated.

According to permeable metal substrate, the metal-supported solid oxide fuel cell (SOFC) and the method for manufacturing a metal-supported SOFC that are provided above, the permeable metal substrate is advantageous by its abilities to resist oxidization, impact and thermal shock and thus it is not brittle; and also the permeable metal substrate is designed with an expansion coefficient matching enough to that of the electrolyte used in the SOFC for facilitating the manufacturing of the functional layers of the metal-supported SOFC on the permeable metal substrate by using an atmospheric plasma spraying process.

In addition, by adopting the aforesaid permeable metal substrate in a metal-supported SOFC, the efficiency for guiding hydrogen to flow entering the anode layer, and draining water vapor byproduct out of the anode layer can be enhanced. In addition, as the permeable metal substrate is advantageous by its abilities to resist oxidization, impact and thermal shock, and thus it is designed with satisfactory mechanical strength so that the deformation of the permeable metal substrate occurred in a low-cost rapid coating atmospheric plasma spraying process for manufacturing a cell can be well minimized within an acceptable range.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
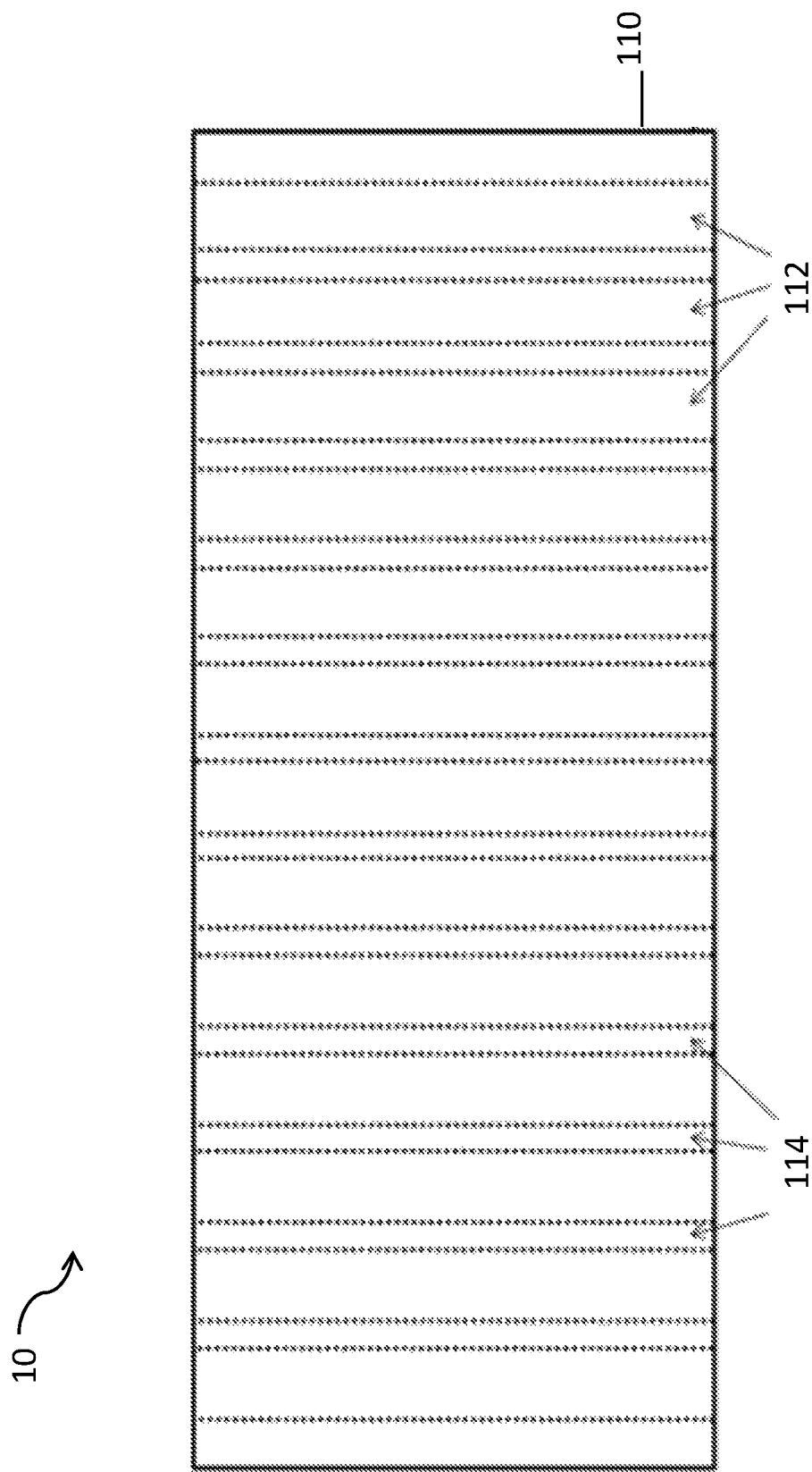
FIG. 1 is a schematic view of a substrate body according to an embodiment of the present invention.
Figure 2:
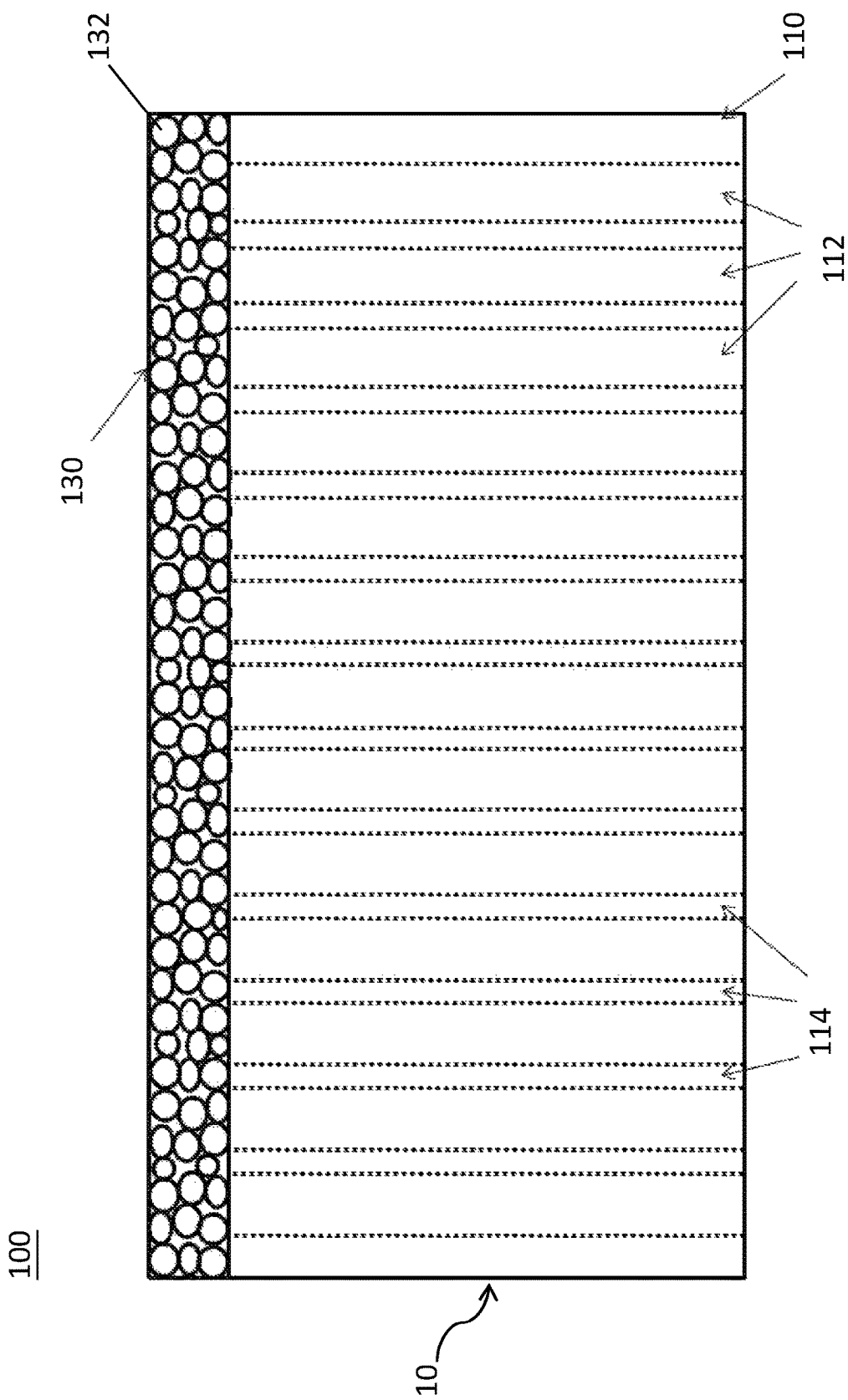
FIG. 2 is a schematic view of a permeable metal substrate according to an embodiment of the present invention.

FIG. 1 is a schematic view of a substrate body according to an embodiment of the present invention. FIG. 2 is a schematic view of a permeable metal substrate according to an embodiment of the present invention.

As shown in FIG. 1 and FIG. 2, a permeable metal substrate 100 includes a substrate body 10 and a permeable or porous powder layer 130.

In this embodiment, the substrate body 10 is substantially a single thick substrate 110. In reality, the thick substrate 110 can be a metallic interconnect used in a solid oxide fuel cell (SOFC) system. The thickness of the thick substrate 110 is ranged from 0.5 to 1.5 mm and the area size of the thick substrate is ranged from 5×5 cm$^2$ to 20×20 cm$^2$. In addition, the thick substrate 110 is a metallic interconnect that has been perforated by a drilling process, whereas the drilling process can be a process selected from the group consisting of: a laser drilling process, a mechanical drilling process and the combination of the two; and the metallic interconnect is formed of a chromium-containing ferritic stainless steel, such as Crofer 22 and ZMG232, since the expansion coefficient, the high temperature mechanical strength and the oxidize resistance of such chromium-containing ferritic stainless steels can meet the SOFC requirements.

The thick substrate 110 is formed with a plurality of permeable straight first gas channels 112, whereas there is an airtight gap 114 to be formed between any two neighboring first gas channels 112. It is noted that each of the plural first gas channels 112 can be formed by a drilling process selected from the group consisting of: a laser drilling process, a mechanical drilling process and the combination of the two. After the thick substrate 110 is perforated by the drilling process, a permeable powder layer is coated on the thick substrate 110, and then the steps for forming functional layers of the SOFC by using an atmospheric plasma spraying process can be enabled.

Each of the first gas channels 112 can be formed in a shape selected from the group consisting of: a column, a pentagonal prism, hexagonal prism and an octagonal prism, but is not limited thereby; and for the gas channels in column shape, each first gas channels 112 can be formed with a diameter ranged from 0.3 to 1.5 mm.

As shown in FIG. 2, the permeable powder layer 130 is disposed on the thick substrate 110, and the thickness of the permeable powder layer 130 is ranged from 50 to 200 μm. In a condition when the surface pore size of the permeable powder layer 130 is smaller than 30 μm, the permeable metal substrate 100 is considered to be ready for a plasma spraying/coating process.

The permeable powder layer 130 is substantially a thin porous layer consisting of a plurality of particles of powder material 132 with particle sizes ranged from 5 to 75 μm, and the powder material 132 can be nickel, nickel-iron ally or nickel-cobalt alloy. Operationally, the particles of powder material 132 with adhesive can be formed into a green layer by using a tape caster, and this green layer is sintered into a permeable powder layer by a high temperature sintering process either in a vacuum circumstance or in a reducing atmosphere at a temperature ranged from 800° C. to 1100° C. Thereafter, by disposing this permeable powder layer onto the thick substrate 110 and using high temperature pressing process either in the vacuum circumstance or in a reducing atmosphere at a temperature ranged from 800° C. to 1100° C. under a pressure smaller than 30 tons, the permeable powder layer 130 is laminated and connected to the thick substrate 110. It is noted that pressure required can be adjusted according to the areas of the permeable powder layer 130 and the thick substrate 110.

From the above description, each of the plural first gas channels in this embodiment can substantially be a straight through-hole, so that the tortuosity of the first gas channel is zero and then is beneficially for the transmission of water vapor and hydrogen. When the thick substrate 110 is substantially a metallic interconnect used in the SOFC system, there will be a thin layer containing $Cr_2O_3$ and spinel such as Mn—Cr spinel formed on the surface of the thick substrate 110 of FIG. 2 as it is being oxidized. Thus, this layer containing $Cr_2O_3$ and spinel such as Mn—Cr spinel can be used for preventing the interior of the thick substrate 110 from further oxidization, and also since this layer of $Cr_2O_3$ and spinel can maintain a satisfactory conductivity in the working temperature of the SOFC, ohmic losses are minimized to a negligible extent.

Therefore, the permeable metal substrate 100 in this embodiment not only is considered to be able to resist oxidization, impact and thermal shock and thus it is not brittle, but also is designed with an expansion coefficient matching enough to that of the electrolyte used in the SOFC for facilitating the manufacturing of the functional layers of the metal-supported SOFC on the permeable metal substrate.

In the aforesaid permeable metal substrate 100, the substrate body is a single piece of thick substrate 110, but it is not limited, according to the embodiment shown in FIG. 3 to FIG. 7.

Figure 3:
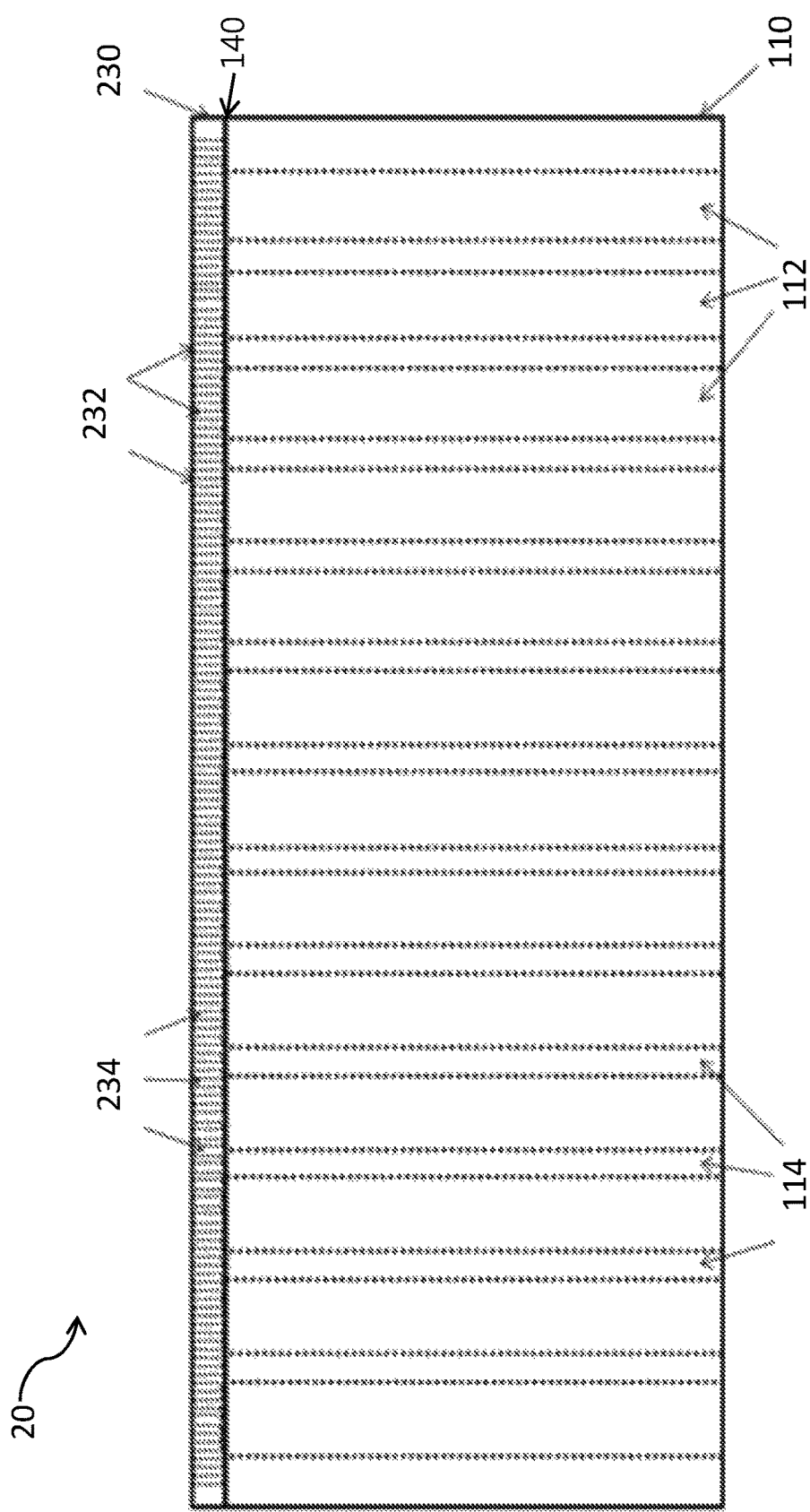
FIG. 3 is a schematic view of a substrate body according to another embodiment of the present invention.
Figure 4:
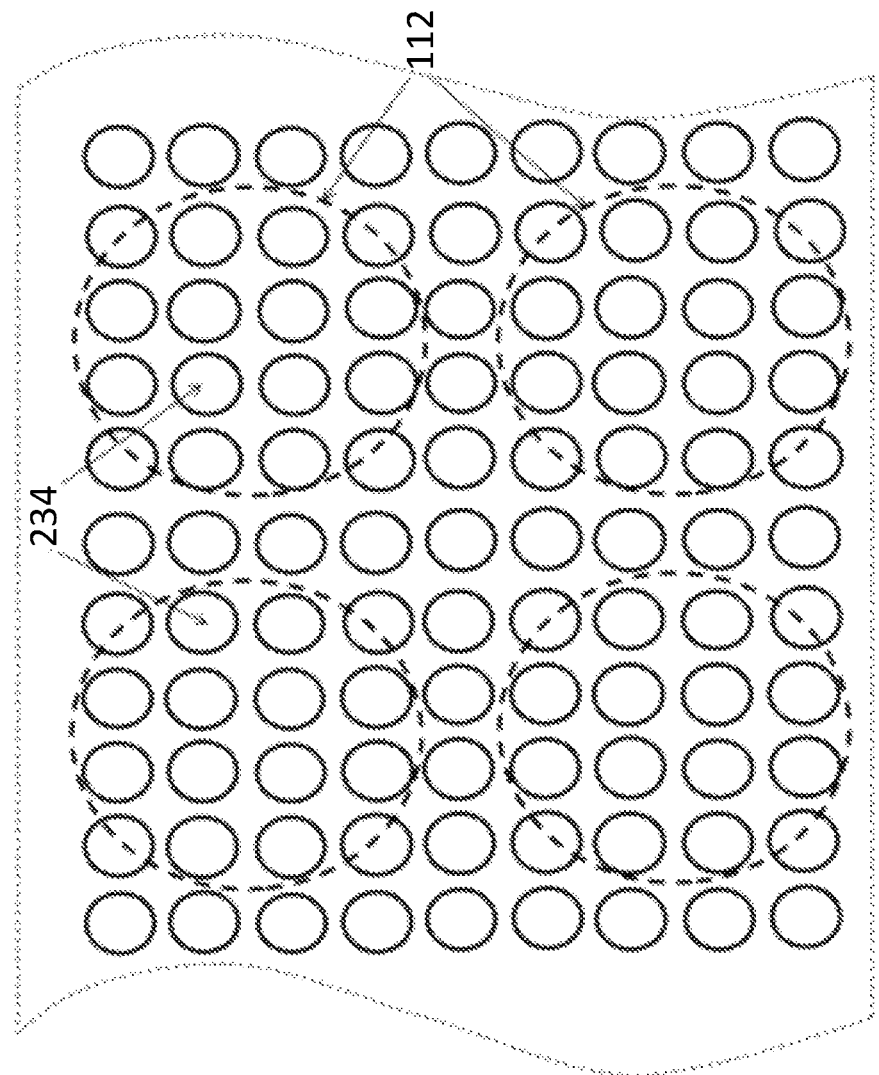
FIG. 4 is the down view of the substrate body shown in FIG. 3.

FIG. 3 is a schematic view of a substrate body according to another embodiment of the present invention. FIG. 4 is down view of the substrate body shown in FIG. 3. In the embodiment shown in FIG. 3 and FIG. 4, the substrate body 20 is similar to the substrate body 10 shown in FIG. 1 but with a few difference, and thus the common units with the same functions used in these two embodiments will be labeled by the same numbering, only those different units will be labeled differently.

Comparing to the embodiment shown in FIG. 1 and FIG. 2, the body substrate 20 is a laminate consisting of a thick substrate 110 and a thin substrate 230 that are welded together by a high temperature brazing process, while the thin substrate 230 is disposed on the thick substrate 110, and the thickness of the thin substrate 230 is smaller than that of the thick substrate 110. Moreover, the thickness of the thick substrate 110 is ranged from 0.5 to 1.5 mm, the thickness of the thin substrate 230 is ranged from 0.1 to 0.2 mm, and the area sizes of both thick and thin substrates are ranged from 5×5 cm$^2$ to 20×20 cm$^2$.

The thick substrate 110 is formed with a plurality of permeable straight first gas channels 112, whereas there is an airtight gap 114 to be formed between any two neighboring first gas channels 112. It is noted that each of the plural first gas channels 112 can be formed by a drilling process selected from the group consisting of: a laser drilling process, a mechanical drilling process and the combination of the two.

In reality, the thick substrate 110 can be a thick metallic interconnect used in a solid oxide fuel cell (SOFC) system that is perforated by a drilling process, while the thin substrate 230 can be a thin metallic interconnect used in the SOFC system that that is also perforated by a drilling process.

Specifically, the thick substrate 110 is formed with a plurality of first gas channels 112, whereas there is an airtight gap 114 to be formed between any two neighboring first gas channels 112; and similarly the thin substrate 230 is formed with a plurality of second gas channels 232, whereas there is an airtight gap 234 to be formed between any two neighboring second gas channels 232.

Each of the first gas channels 112 can be formed in a shape selected from the group consisting of: a column, a pentagonal prism, hexagonal prism and an octagonal prism, but is not limited thereby; and for instance each of first gas channels 112 can be formed by a column shape with a diameter ranged from 0.3 to 1.5 mm. For the first gas channels, the percentage of perforated area, i.e. the total area of the through-holes/the area of the metallic interconnect before being perforated, is about 15~60%.

Similarly, each of the second gas channels 232 can be formed in a shape selected from the group consisting of: a column, a pentagonal prism, hexagonal prism and an octagonal prism, but is not limited thereby.

It is noted that each of the plural second gas channels 232 can be formed by a drilling process selected from the group consisting of: a laser drilling process, a mechanical drilling process and the combination of the two. Moreover, each of the plural second gas channels 232 in this embodiment can substantially be a straight through-hole that is formed with a diameter ranged from 0.08~0.15 mm. For the second gas channels, the percentage of perforated area, i.e. the total area of the through-holes/the area of the metallic interconnect before being perforated, is about 15~60%. It is noted that comparatively the hole size of the second gas channel 232 is smaller than that of the first gas channel 112.

Taking a laser drilling process for instance, the positioning and the drilling for straight through-holes are computer controlled and programmed. In this embodiment, a portion of the plural first gas channels 112 is connected to the plural second gas channels 232 by an end thereof, the flow transmitted from such first gas channels 112 can permeate directly to the second gas channels 232 without being blocked.

Figure 5:
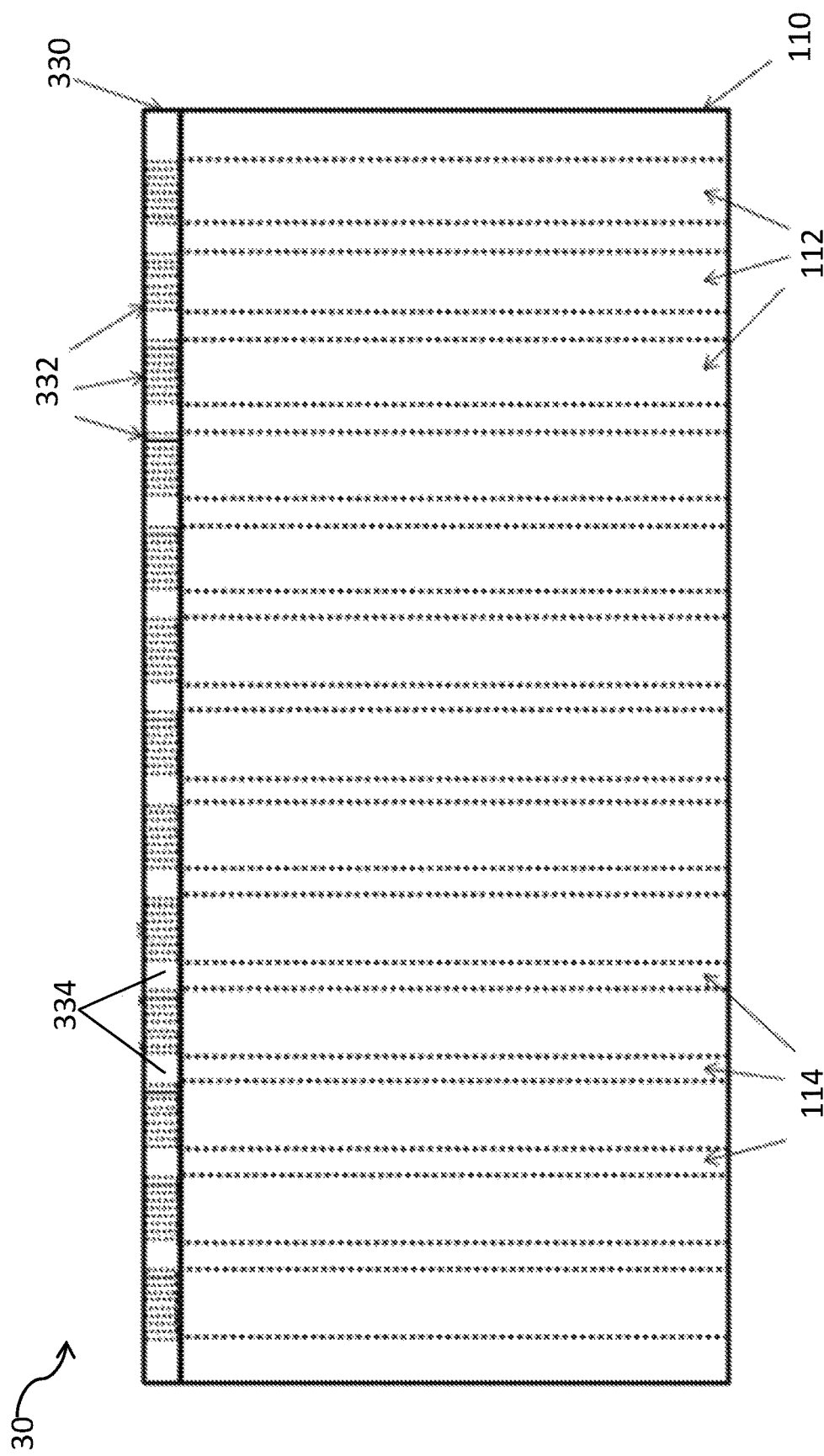
FIG. 5 is a schematic view of a substrate body according to further another embodiment of the present invention.
Figure 6:
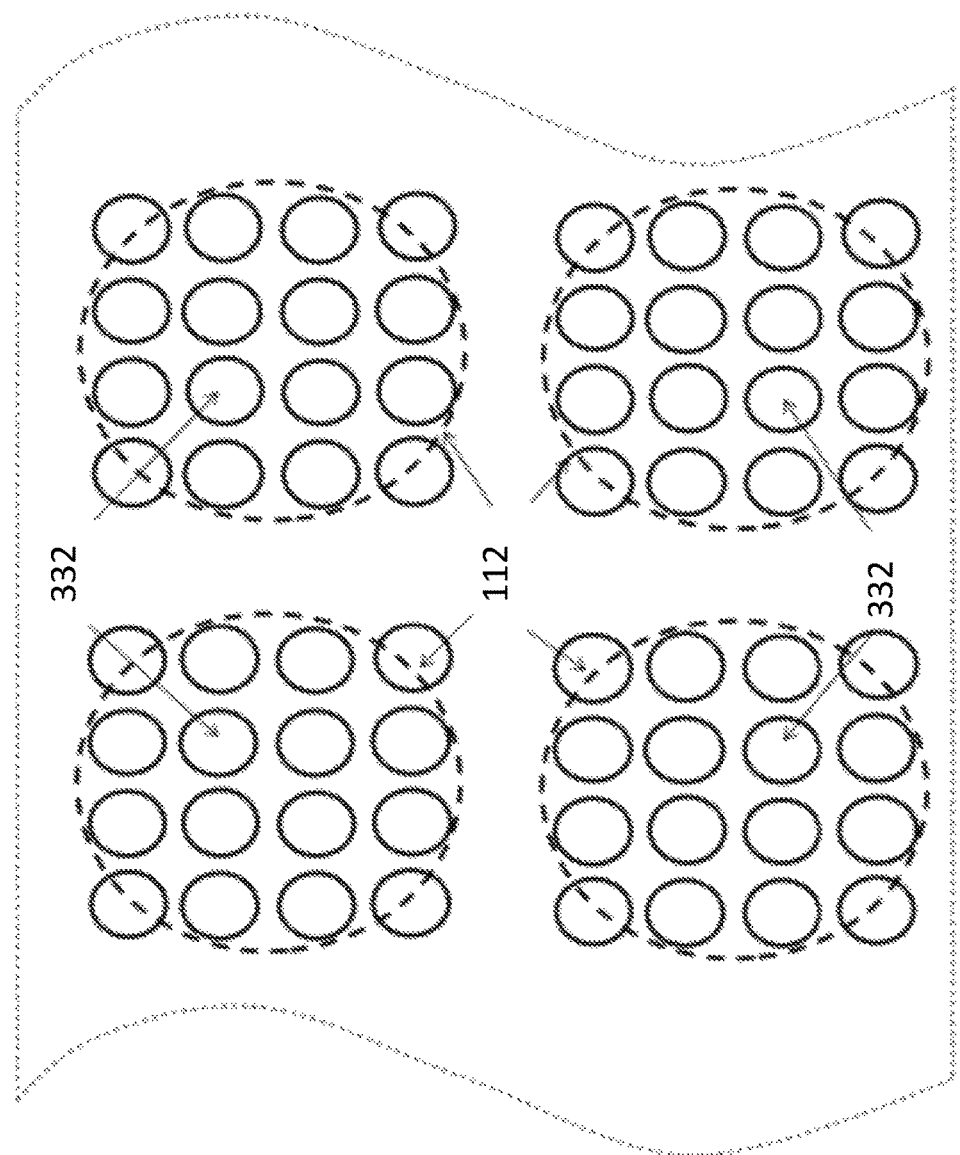
FIG. 6 is the down view of the substrate body shown in FIG. 5.

FIG. 5 is a schematic view of a substrate body according to further another embodiment of the present invention. FIG. 6 is down view of the substrate body shown in FIG. 5. In the embodiment shown in FIG. 5 and FIG. 6, the substrate body 30 is similar to the substrate body 20 shown in FIG. 3 but with a few difference, and thus the common units with the same functions used in these two embodiments will be labeled by the same numbering, only those different units will be labeled differently.

The difference between the substrate body 30 of FIG. 5 and the substrate body 20 of FIG. 3 is that: the thin substrate 332 is formed with a plural of straight permeable second gas channels 332 and a plurality of airtight gaps 334, in a manner that all the second gas channels 332 are positioned exactly corresponding to the plural first gas channels 112. That is, the plural second gas channels 332 are positioned directly above the plural first gas channels 112. Thereby, the total amount of the second gas channels 332 that is required to be formed on the thin substrate 332 for maintaining the same permeability can be reduced.

Figure 7:
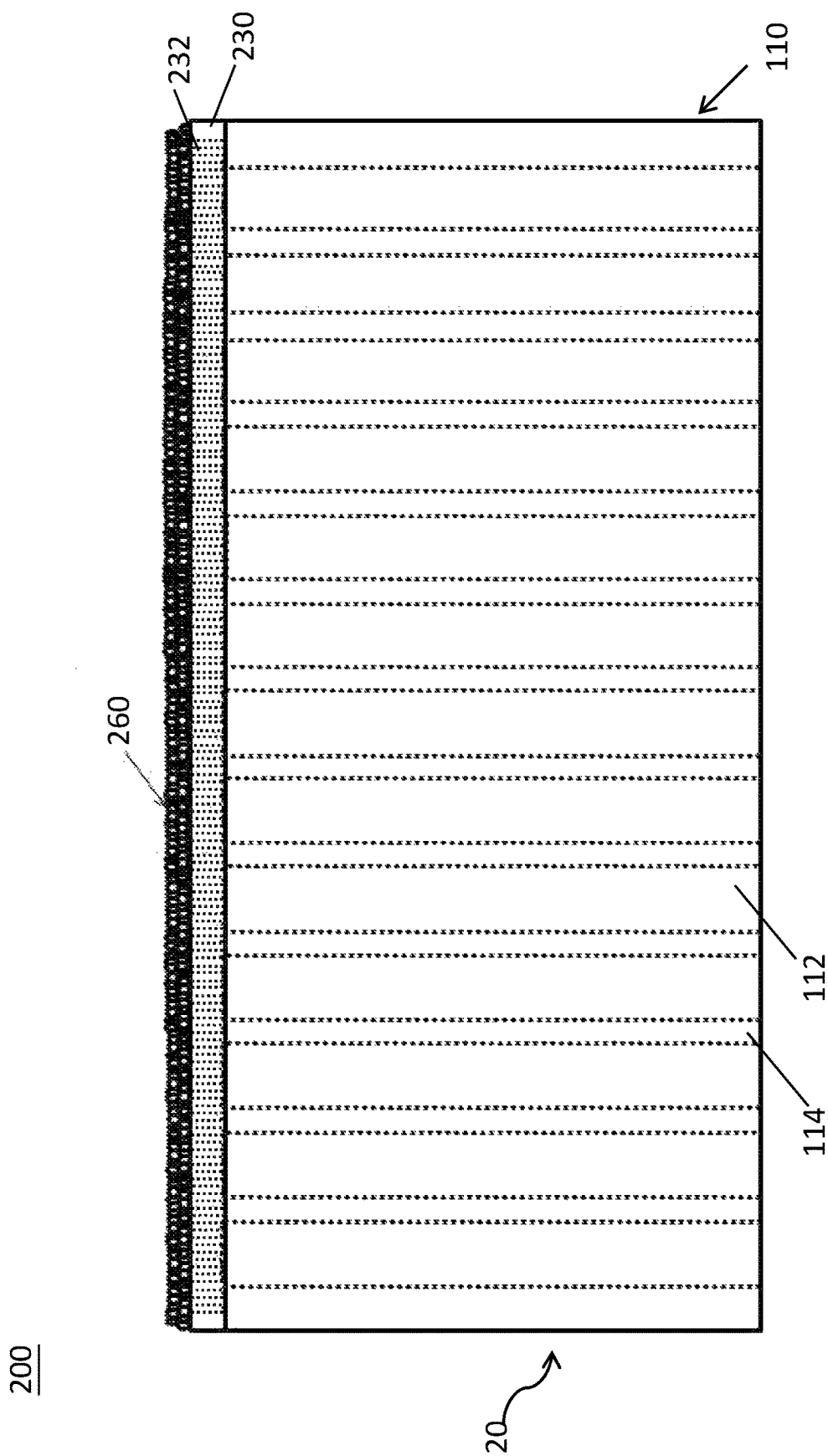
FIG. 7 is a schematic view of a permeable metal substrate using the substrate body of FIG. 3.

FIG. 7 is a schematic view of a permeable metal substrate using the substrate body of FIG. 3. In the embodiment shown in FIG. 7, the permeable metal substrate 200 is similar to the substrate body 20 shown in FIG. 3 but with a few difference, and thus the common units with the same functions used in these two embodiments will be labeled by the same numbering, only those different units will be labeled differently.

In FIG. 7, the permeable metal substrate 200 further includes a permeable or porous powder layer 260 that is disposed on the thin substrate 230 while allowing the thin substrate 230 to be disposed between the permeable powder layer 260 and the thick substrate 110. That is, the substrate body 20 in the permeable metal substrate 200 of the present embodiment is a laminate consisting of a thick substrate 110 and a thin substrate 230 that are welded together by a high temperature brazing process, and then there is a permeable powder layer 260 being formed on the thin substrate 230. Similarly, the permeable metal substrate 200 is about 0.65~1.9 mm in thickness and 5×5~20×20 cm$^2$ in area size.

In this embodiment, the permeable powder layer 260 can be formed in a way similar to that shown in FIG. 2, or can be formed differently. For example, it can be formed by atmospheric plasma spraying a plurality of particles of metal material with particle sizes ranged from 5 to 75 μm on the thin substrate 230 for forming a permeable powder layer 260 of 50~200 μm in thickness. Thus, the permeable powder layer 260 includes a plurality of metal particles of different particle sizes, whereas such metal particles can be nickel powder, nickel-iron powder or nickel-cobalt powder. In a condition when the metal particles is made of a nickel-iron alloy, the weight ratio of iron in such nickel-iron alloy can be about 10~50 wt %.

In other embodiments, the permeable powder layer 260 can be formed on the thin substrate 330 of FIG. 5.

Figure 8:
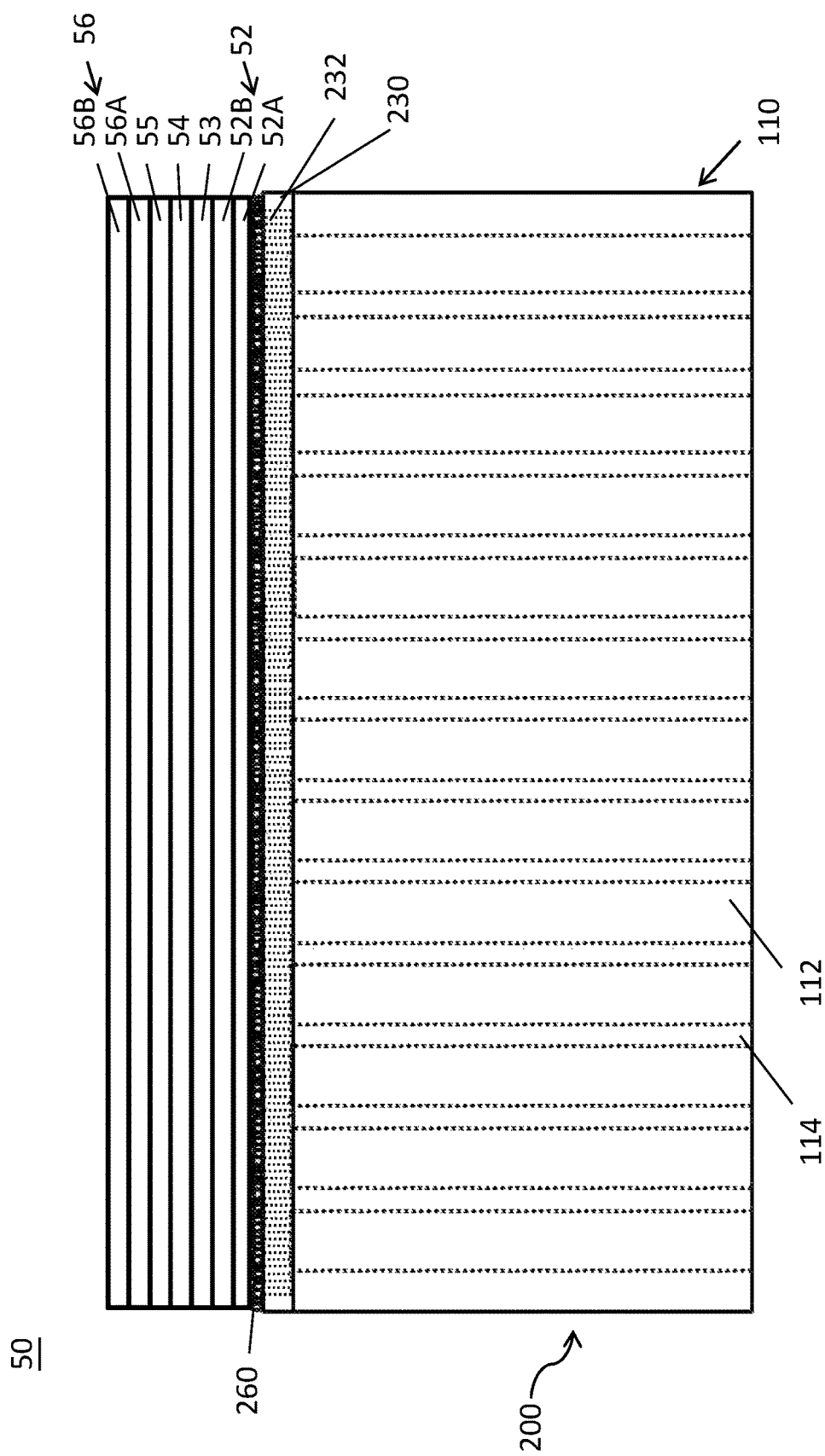
FIG. 8 is a schematic view of a metal-supported SOFC of the present invention.

Please refer to FIG. 8, which is a schematic view of a metal-supported SOFC of the present invention. In FIG. 8, a SOFC 50 includes a porous substrate 200, a porous anode layer 52, a dense anode isolation layer 53, a dense electrolyte layer 54, a dense cathode isolation layer 55 and a porous cathode layer 56.

The porous anode layer 52, that is disposed on the permeable powder layer 260, is composed of a first anode layer 52A and a second anode layer 52B in a manner that the second anode layer 52B is a nano-sized structure; the first anode layer 52A is a micron-sized structure or a submicron-sized structure; the first anode layer 52A is substantially a YSZ-NiO layer that is formed by mixing a material of YSZ and a material of NiO uniformly in a weight ratio of 40:60, 50:50 or 60:40, while the particle sizes of the YSZ material and the NiO material are micron-scaled or submicron-scaled; and the second anode layer 52B is substantially a LDC-NiO layer that is formed by mixing a material of LDC and a material of NiO uniformly in a weight ratio of 40:60, 50:50 or 60:40, while the particle sizes of the LDC material and the NiO material are nano-scaled.

For clarification, the nano-scaled particle is a particle with particle size that is smaller than 100 nm, such as LDC and NiO in the second anode layer 52B; the submicron-sized particle is a particle with particle size that is ranged from 100 nm to 500 nm, such as YSZ and NiO in first anode layer 52A; and a micron-scaled particle is a particle with particle size that is ranged from 1 μm to 10 μm, such as YSZ and NiO in first anode layer 52A. Thus, the nano-sized structure is formed of particles with particle sizes smaller than 100 nm; or a submicron-sized structure is formed of particles with particle sizes ranged from 100 nm to 500 nm, and the micron-sized structure is formed of particles with particle sizes ranged from 1 μm to 10 μm.

The second anode layer 52B is disposed between the first anode layer 52A and the dense anode isolation layer 53, while the first anode layer 52A is disposed on the permeable powder layer 260 of the permeable metal substrate 200.

The dense anode isolation layer 53 is disposed on the second anode layer 52B, this dense anode isolation layer can be a SDC ($Sm_{0.15}Ce_{0.85}O_{3-\delta}$ for example) layer or a LDC ($Ce_{0.55}La_{0.45}O_{2-\delta}$ for example) layer. It is noted that SDC particles or the LDC particles that are used for manufacturing the dense anode isolation layer 53 are nano-scaled particles.

The dense electrolyte layer 54 is disposed on the dense anode isolation layer 53, this dense electrolyte layer can be a LSGM ($La_{0.8}Sr_{0.2}Ga_{0.8}Mg_{0.2}O_{3-\delta}$ for example) layer or a layer formed by a mixture of LSGM (10~20 wt %) and LDC (80~90 wt %).

The dense cathode isolation layer 55 is disposed on the dense electrolyte layer 54, this dense cathode isolation layer can be a SDC layer or LDC layer. It is noted that SDC particles or the LDC particles that are used for manufacturing the dense cathode isolation layer 55 are nano-scaled particles.

The porous cathode layer 56 is disposed on the dense cathode isolation layer 55, and is further composed of a cathode interlayer 56A and a cathode current collecting layer 56B that are porous.

The cathode interlayer 56A is sandwiched between the cathode current collecting layer 56B and the dense cathode isolation layer 55. Moreover, the cathode interlayer 56A can be a layer selected from the group consisting of: a LDC-LSCo ($La_{0.6}Sr_{0.4}CoO_{3-\delta}$ for example) layer, a LDC-LSCF ($La_{0.6}Sr_{0.4}Co_{0.2}Fe_{0.8}O_{3-\delta}$ for example) layer, a LDC-SSC ($Sm_{0.5}Sr_{0.5}CoO_{3-\delta}$ for example) layer, a SDC-LSCo layer, a SDC-LSCF layer and a SDC-SSC layer, and the weight ratio of LDC or SDC to LSCo or LSCF or SSC is 40:60, or 50:50 or 60:40 in forming those layers, while the particle size of the LDC material or the SDC material is nano-scaled, and the particle size of the LSCo material or the LSCF material, or the SSC material is submicron-scaled.

The cathode current collecting layer 56B can be a layer selected from the group consisting of: a LSCo layer, a LSCF layer, and a SSC layer, while the particle size of the LSCo material, or the LSCF material, or the SSC material is submicron-scaled.

It is noted that the permeable metal substrate used in the embodiment shown in FIG. 8 is the permeable metal substrate 200 shown in FIG. 7 while enabling a porous anode layer 52, a dense anode isolation layer 53, a dense electrolyte layer 54, a dense cathode isolation layer 55 and a porous cathode layer 56 to be sequentially formed on its permeable powder layer 260 by using an atmospheric plasma spraying process.

However, other permeable metal substrates in this application can be adopted and used as the permeable metal substrate of the present embodiment also, such as the permeable metal substrate 100 of FIG. 2. Taking the substrate body 30 for example, the substrate body 30 after having a permeable powder layer 260 of FIG. 7 coated on it thereon can be used as the permeable metal substrate of the present embodiment. Taking the substrate bodies shown in FIG. 1 and FIG. 3 for example, the thick substrate 110 of FIG. 1 or the laminate of the thick substrate 110 and the thin substrate 330 that are welded together by the high temperature brazing process, as shown in FIG. 3, after having permeable powder layers 260 of FIG. 7 coated on them thereon can be used as the permeable metal substrate of the present embodiment. The permeable metal substrate 200 is a conductive structure that can function as an anode current collecting layer. The first anode 52A, the second anode layer 52B, the cathode interlayer 56A and the cathode current collecting layer 56B are all porous permeable structures, while the dense anode isolation layer 53, the dense cathode isolation layer 55 and the dense electrolyte layer 54 are dense structures with airtightness.

Thus, the permeable metal substrate 200 of the present embodiment is formed with an expansion coefficient matching enough to that of the electrolyte 54 used in the SOFC 50 while the permeable metal substrate 200 is formed with the plural permeable straight channels of first gas channels 112 and second gas channels 232, which not only can be helpful for improving the transmission of water vapor and hydrogen, but also improving the efficiency of guiding hydrogen to flow entering the anode layer 52, and draining water vapor byproduct out of the anode layer 52. In addition, as the substrate body 20 of the permeable metal substrate 200 is advantageous by its abilities to resist oxidization, impact and thermal shock and thus it is designed with satisfactory mechanical strength, the deformation of the permeable metal substrate can be minimized within an acceptable range when this substrate is used in a low-cost rapid coating atmospheric plasma spraying process for manufacturing a cell.

The first anode layer 52A with a micron-scaled or sub-micron-scaled structure to be formed in the metal-supported SOFC of the present embodiment is substantially an YSZ-NiO layer and the second anode layer 52B with a nano-scaled structure is substantially a LDC-NiO layer. Since the binding strength between sintered YSZ powders is larger than that between sintered LDC powders, the overall anode layer strength is enhanced by adding the first anode layer 52A into the designed anode.

Figure 9:
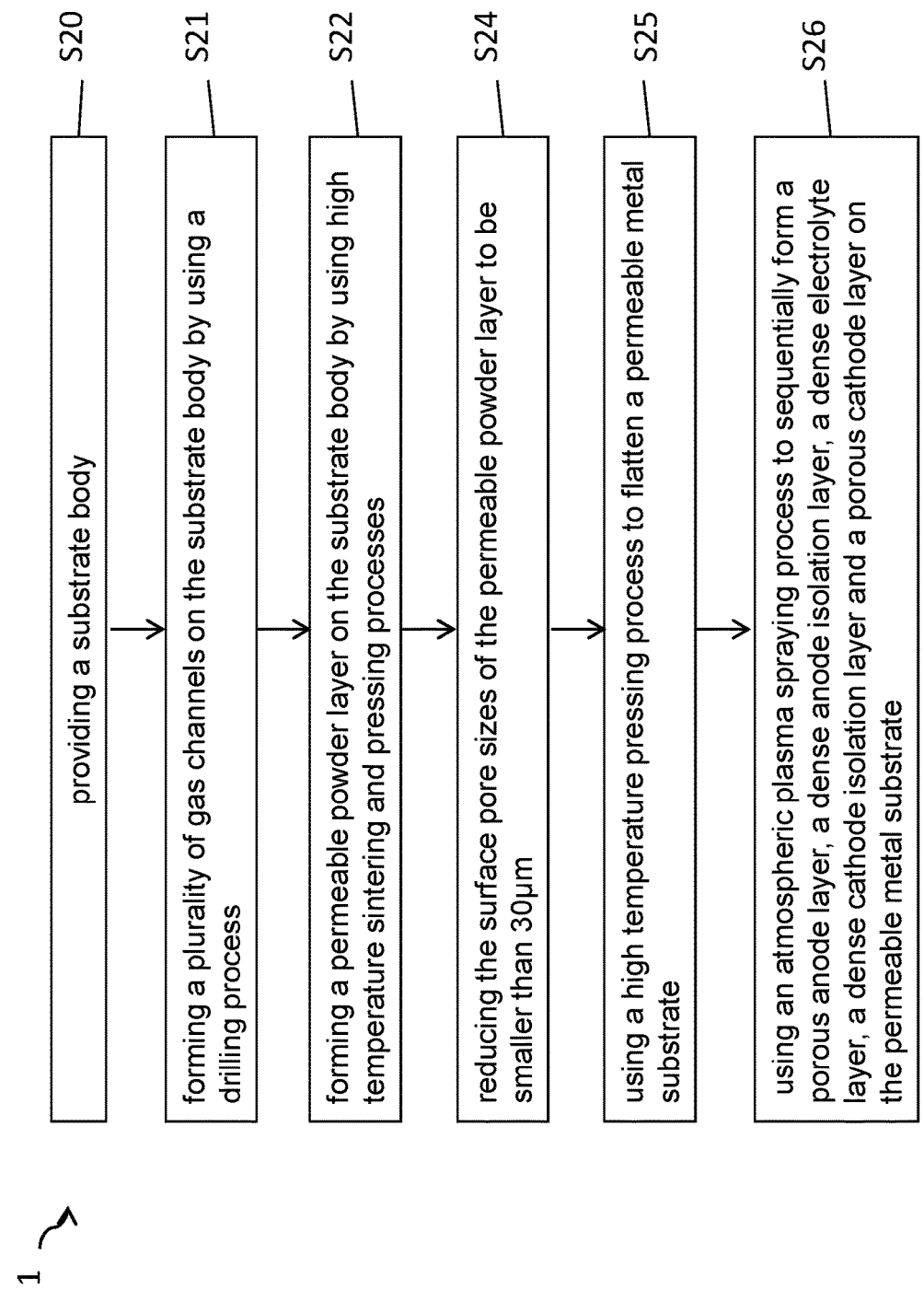
FIG. 9 is a flow chart showing the steps performed in a method for manufacturing a metal-supported SOFC according to an embodiment of the present invention.

FIG. 9 is a flow chart showing the steps performed in a method for manufacturing a metal-supported SOFC according to an embodiment of the present invention.

Before starting the manufacturing method of FIG. 9, the structure of the permeable metal substrate, perforation specification defining hole sizes, hole range and hole number, and the material used for the permeable metal substrate as well as the specification of the permeable metal substrate in size and thickness are defined firstly. It is noted that the permeable metal substrate can have the substrate body 10 of FIG. 1, the substrate body 20 of FIG. 3, or the substrate body 30 of FIG. 5 as a component to form the metal substrate. However, in explaining the manufacturing method embodiment shown in FIG. 9, the substrate body 10 of FIG. 1 is used.

As shown in FIG. 9, a method 1 for manufacturing a metal-supported SOFC starts from the step S20.

At step 20, a substrate body 10 is provided.

It is noted that the substrate body 10 can be treated as a single thick substrate 110 and is only used for illustration. Thus, the substrate body 10 can be a solid metallic interconnect used in a solid oxide fuel cell (SOFC) system and perforated by a drilling process, such as laser drilling or mechanical drilling. The thickness of the substrate body 10 is ranged from 0.5 to 1.5 mm; and the metallic interconnect is formed of a chromium-containing ferritic stainless steel, such as Crofer 22 and ZMG232, since the expansion coefficient, the high temperature mechanical strength and the oxidize resistance of such chromium-containing ferritic stainless steels can meet the SOFC requirements.

Thereafter, the step S21 is proceeded. At the step S21, a plurality of straight gas channels is formed on the substrate body 10 by using a drilling process, while enabling each of the plural straight gas channels to be drilled all the way through the substrate body 10.

As shown in FIG. 1, the substrate body 10 can be a single thick substrate 110, which is substantially a metallic interconnect used in a SOFC system and perforated by a laser drilling process, and thus the thick substrate 110 is further formed with a plurality of permeable straight gas channels 112.

In this embodiment, each gas channel 112 is formed with a channel hole size ranged from 0.3 to 1.5 mm, while the percentage of total area of 112 gas channels/the area of the metallic interconnect before being perforated, is about 15~60%. Here, the channel hole size is a diameter of straight gas channels in column shape, or an average diameter of straight gas channels in polygonal shape, such as pentagonal, or hexagonal or octagonal shape.

Figure 10:
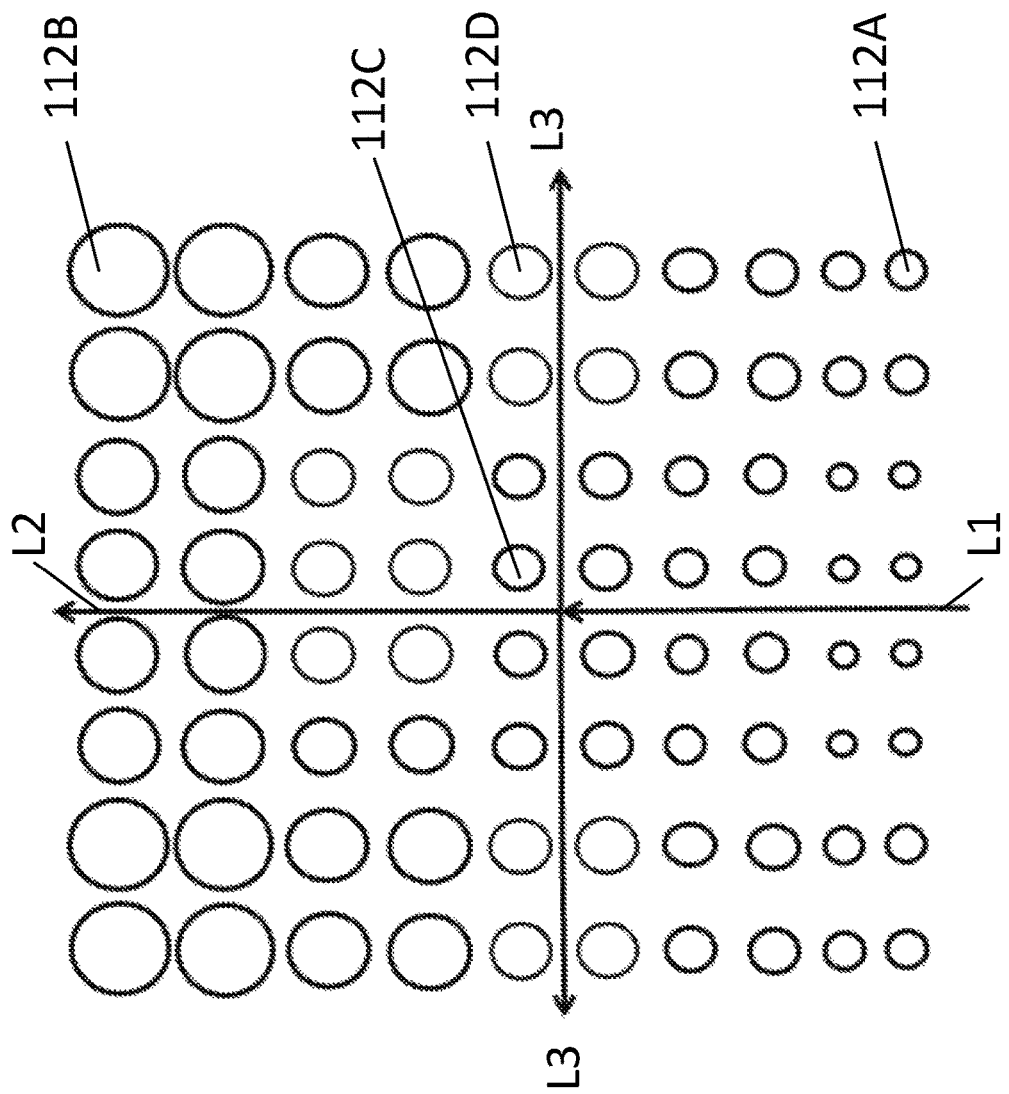
FIG. 10 is a schematic diagram showing a hole size distribution of a plurality of permeable straight gas channels on a substrate body of the present invention.

Since the positioning and the drilling for drilling straight gas channels 112 are computer controlled and programmed, the perforation specification defining hole sizes, hole range and hole number must be defined before the drilling and is prepared for the program. Moreover, the hole sizes of the straight gas channels 112 can either be maintained unchanged or are changed as shown in FIG. 10. FIG. 10 is a schematic diagram showing the hole size distribution of a plurality of permeable straight gas channels on a substrate body of the present invention. As shown in FIG. 10, a fuel gas is guided to flow in a direction from the L1 toward L2, while the fuel gas is allowed to expand in a direction L3 that is perpendicular to the fuel flowing direction. In FIG. 10, the hole sizes of the gas channels 112A, 112D and 112B are increased along a direction that is parallel the fuel flowing direction, but it is not limited thereby. In another embodiment, the distribution densities of the gas channels can also be maintained unchanged or increased along a direction that is parallel the fuel flowing direction. In addition, the hole sizes of the gas channels 112C to 112D are increased along a direction that is perpendicular to the fuel flowing direction, but it is not limited thereby, while similarly the distribution densities of the gas channels can also be maintained unchanged or increased along a direction that is perpendicular to the fuel flowing direction. Therefore, the hole sizes or the distribution densities of the first or the second gas channels are maintained unchanged or increasing along directions that are parallel and perpendicular to the fuel flowing direction.

After step S21, the step S22 is proceeded. At the step S22, a permeable powder layer 130 is formed on the substrate body 10 by using high temperature sintering and pressing processes. In explaining this embodiment, the thick substrate 110 of FIG. 2 is used.

In this embodiment, the particles of powder material 132 with adhesive are formed into a green layer by using tape caster, and this green layer is sintered into a permeable powder layer by a high temperature sintering process either in the vacuum circumstance or in a reducing atmosphere at a temperature ranged from 800° C. to 1100° C. Thereafter, by disposing this permeable powder layer onto the substrate body 10 and using high temperature pressing process either in the vacuum circumstance or in a reducing atmosphere at a temperature ranged from 800° C. to 1100° C. under a pressure smaller than 30 tons, the permeable powder layer 130 is laminated and connected to the substrate body 10 or the thick substrate 110.

Then, by using an optical or electrical microscope to observe the surface of the permeable powder layer 130 for determining whether there are surface pores with sizes larger than 30 μm; and if not, an atmospheric plasma spraying process is enabled for the SOFC functional layers, such as anode, electrolyte and cathode layers, coated on the substrate.

On the other hand, if there are surface pores with sizes larger than 30 μm, the flow is enabled to proceed to the step S24 for reducing the surface pore sizes of the permeable powder layer to be less than 30 μm.

Figure 11:
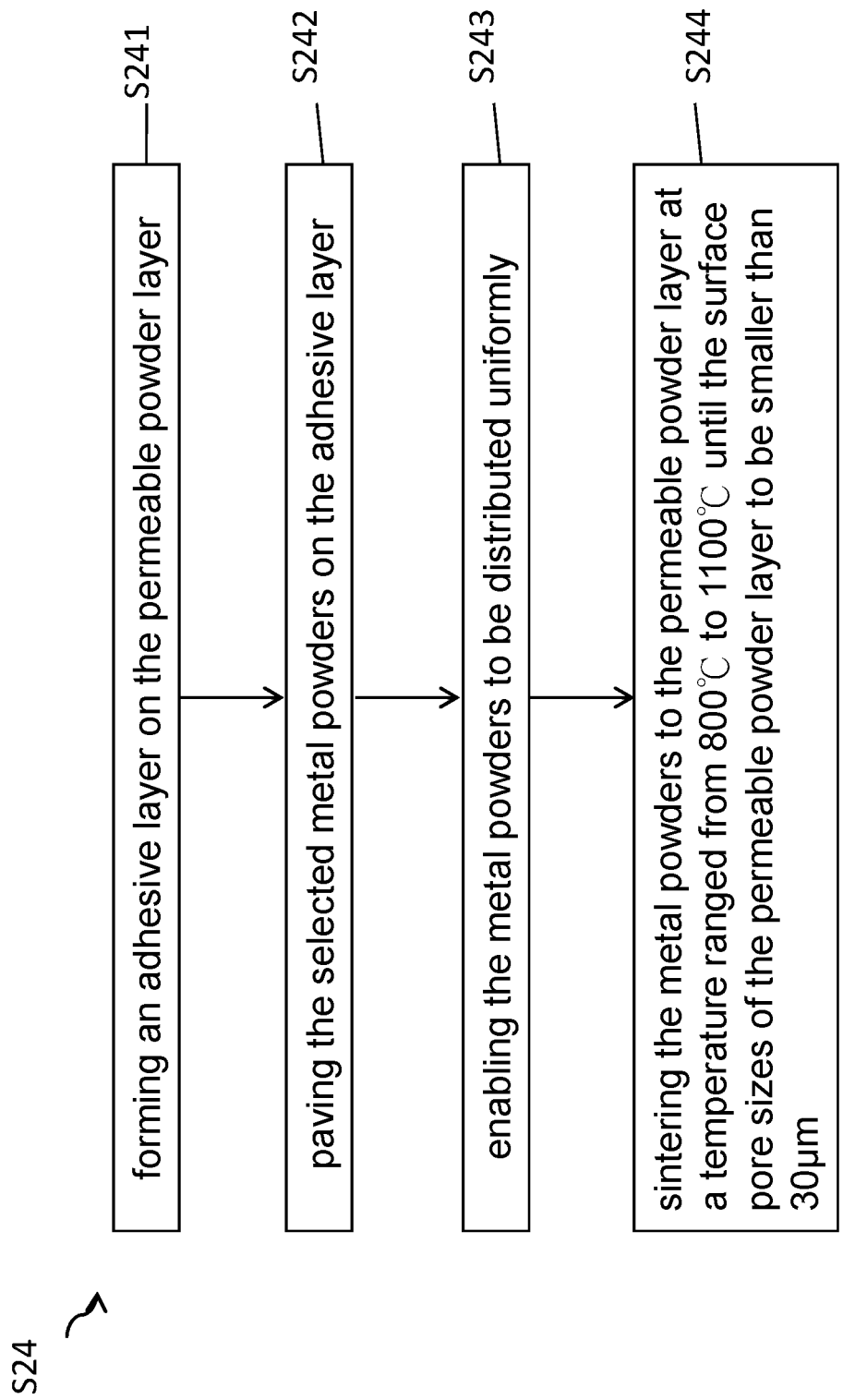
FIG. 11 is a flow chart showing the steps performed for reducing the surface pore size of a permeable powder layer in the present invention.

FIG. 11 is a flow chart showing steps performed for reducing the surface pore sizes of a permeable powder layer in the present invention to be less than 30 μm. At the step S241 shown in FIG. 11, an adhesive layer, such as polyvinyl alcohol (PVA) is formed on the permeable powder layer 130. In this embodiment, the formation is performed by the use of a plastic scraper for scraping a thin layer of PVA on the permeable powder layer 130. After the step S241, the step S242 is enabled. At the step S242, selected powders are paved on the adhesive layer, This selected powders are metal particles with particle sizes smaller than 45 μm, and the metal particles can be made of a material selected from the group consisting of: nickel, nickel-iron alloy, nickel-cobalt alloy. Thereafter, the step S243 is proceeded. At the step S243, the selected powders are to be uniformly distributed. In this embodiment, the excess of metal particles is removed by a vibration, whereas the vibration can also enable the metal particles to be uniformly distributed on the permeable powder layer of the metal substrate 100. After the step S243, the step S244 is proceeded. At the step S244, the selected powders are sintered to the permeable powder layer either in the vacuum circumstance or in a reducing atmosphere at a temperature ranged from 800° C. to 1100° C., until the surface pore sizes of the permeable powder layer are smaller than 30 μm and thus achieving the reduction of large surface pore sizes (greater than 30 μm) of the permeable powder layer of permeable metal substrate 100.

After all the steps S241~S244 had been completed, the step S25 shown in FIG. 9 is proceeded for using a high temperature pressing process to form a permeable metal substrate 100.

At the step S25, the high temperature pressing process is performed either in the vacuum circumstance or in a reducing atmosphere at a temperature ranged from 800° C. to 1100° C. and under a pressure ranged from 10 kg/cm$^2$ to 100 kg/cm$^2$, by that any small protrusions on a substrate are pressed and the permeable metal substrate 100 shown in FIG. 2 are flattened to get smooth surfaces. It is noted the process enabled in the step S25 can enhance the binding strength between particles 132 in the permeable powder layer 130, while also can enhance the binding strength between the permeable powder layer 130 and the thick substrate 110, by that the overall mechanical strength of the permeable metal substrate 100 is increased.

After the step S25, the step S26 is proceeded. At the step S26, an atmospheric plasma spraying process is enabled to sequentially form a porous anode layer, a dense anode isolation layer, a dense electrolyte layer, a dense cathode isolation layer and a porous cathode layer on the permeable metal substrate.

The straight gas channels can be formed and distributed in a way the same as those disclosed in FIG. 10, that is, the hole sizes of the gas channels are increased along directions that are parallel and perpendicular to a fuel gas flowing direction. Without the aforesaid design, the amount of averaged fuel density flowing in each of the gas channels is naturally decreased due to the fuel exhaustion and expansion along directions that are parallel and perpendicular to the fuel flowing direction, hence, the averaged fuel densities at the anode layer of a SOFC and the power densities of a SOFC are varied along directions that are parallel and perpendicular to the fuel flowing direction. By increasing the hole sizes of the gas channels, the averaged fuel densities at the anode of a SOFC can be maintained more even so that the gradients of power densities of a SOFC along directions that are parallel and perpendicular to the fuel flowing direction can be minimized and also the temperature gradient resulted from the power density gradient can be minimized too, in other words, the power densities and temperatures at different positions of this metal-supported SOFC are more uniformly distributed. On the other hand, instead of increasing the hole sizes of gas channels, the distribution densities of the gas channels can be increased along directions that are parallel and perpendicular to the fuel flowing direction so that the power densities and temperatures at different positions of the metal-supported SOFC can be more uniformly distributed. Therefore, by either increasing the hole sizes of the first and the second gas channels, or increasing their distribution densities, the fuel distribution in a SOFC can be more uniformed and thus the lifespan of the SOFC can be increased.

Figure 12:
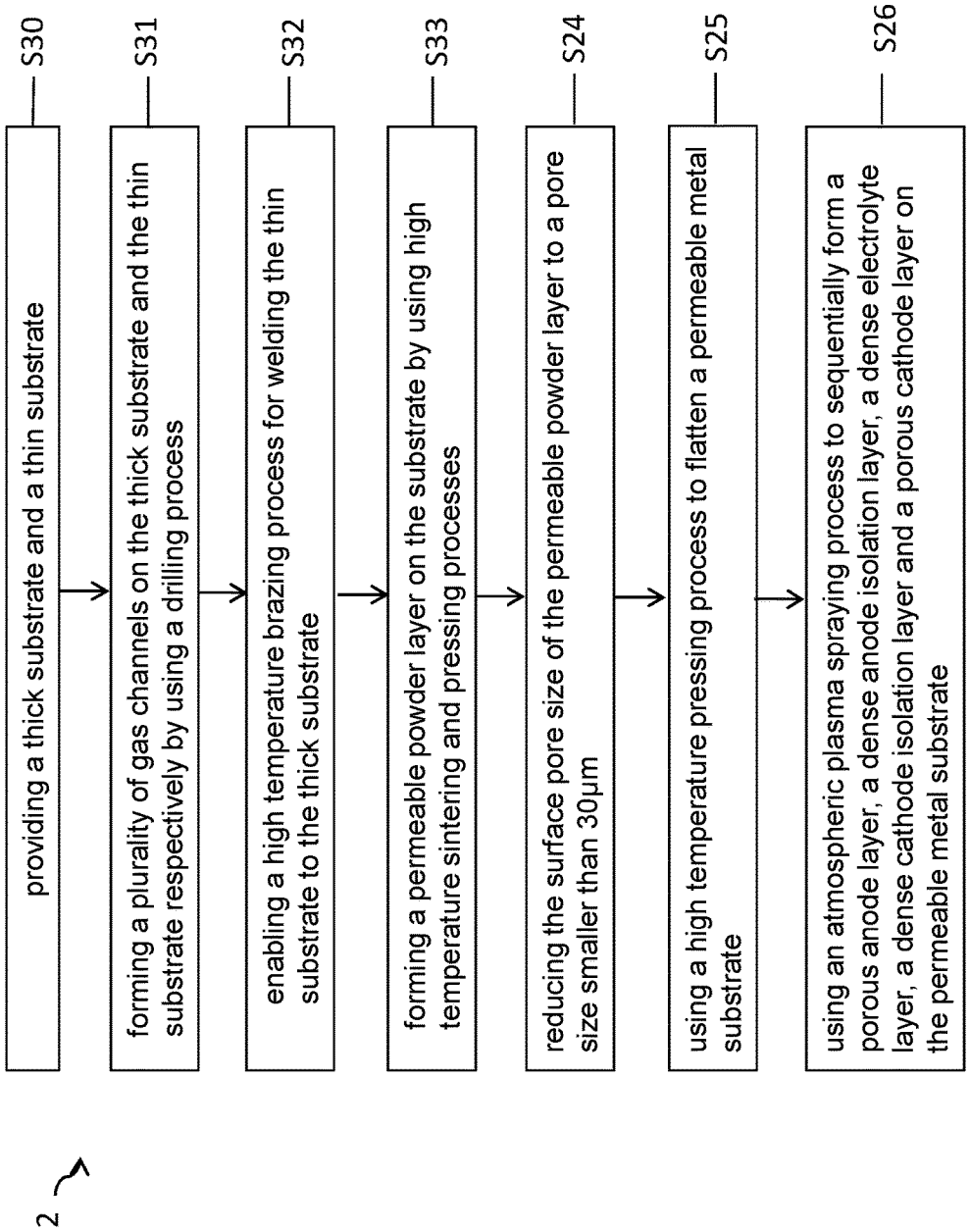
FIG. 12 is a flow chart showing the steps performed in a method for manufacturing a metal-supported SOFC according to another embodiment of the present invention.

Although the above description uses the substrate body 10 of FIG. 1 for illustration, the present invention is not limited thereby, i.e. the substrate body 20 of FIG. 3 and the substrate body 30 of FIG. 5 are also suitable to the above description. Please refer to FIG. 12, which is a flow chart showing the steps performed in a method for manufacturing a metal-supported SOFC according to another embodiment of the present invention. The method 2 shown in FIG. 12 is similar to the method 1 provided in FIG. 9, but with some differences.

The method 2 starts at the step S30. At step S30, a thick substrate and a thin substrate are provided, whereas the two substrates can be made of a metallic interconnect used in a SOFC system.

It is noted that the thin substrate 230 is formed with a thickness that is smaller than that of the thick substrate 110, while the thickness of the thick substrate 110 is ranged from 0.5 to 1.5 mm, the thickness of the thin substrate 230 is ranged from 0.1 to 0.2 mm, and both the area sizes of the thick substrate 110 and the thin substrate 230 are ranged from 5×5 cm$^2$ to 20×20 cm$^2$.

After the step S30, the step S31 is proceeded. At the step S31, the thick substrate 110 and the thin substrate 230 are to be perforated respectively by a laser drilling process. In FIG. 3, the thick substrate 110 is formed with a plurality of permeable straight first gas channels 112 and the thin substrate 230 is formed with a plurality of permeable straight second gas channels 232. Moreover, the perforation of the thick substrate 110 and the thin substrate 230 shown in FIG. 5 is similar to that shown in FIG. 3, but is different in that: the thin substrate 330 is formed with a plural of straight permeable second gas channels 332 in a manner that all the second gas channels 332 are positioned corresponding to the plural first gas channels 112. That is, the plural second gas channels 332 are positioned directly above the plural first gas channels, and thereby, the total amount of the second gas channels 332 that is required to be formed on the thin substrate 332 for maintaining permeability can be reduced. In this embodiment, each of the plural first gas channels is a straight through-hole that is with a hole size ranged from 0.3 to 1.5 mm, and each of the plural second gas channels is a straight through-hole that is formed with a hole size ranged from 0.08 to 0.15 mm. In addition, the plural first gas channels and the plural second gas channels are distributed and formed in a way the same as those shown in FIG. 10, that is, the hole sizes of the first and the second gas channels are increased along directions that are parallel and perpendicular to the fuel flowing direction. By adjusting the hole sizes of gas channels in the above way, the amount of averaged fuel densities at different positions of the anode of a SOFC can be maintained more even. Similarly, by adjusting the densities of gas channels along directions that are parallel and perpendicular to the fuel flowing direction, the averaged fuel densities at different positions of the anode of a SOFC can be maintained more even too.

Figure 13:
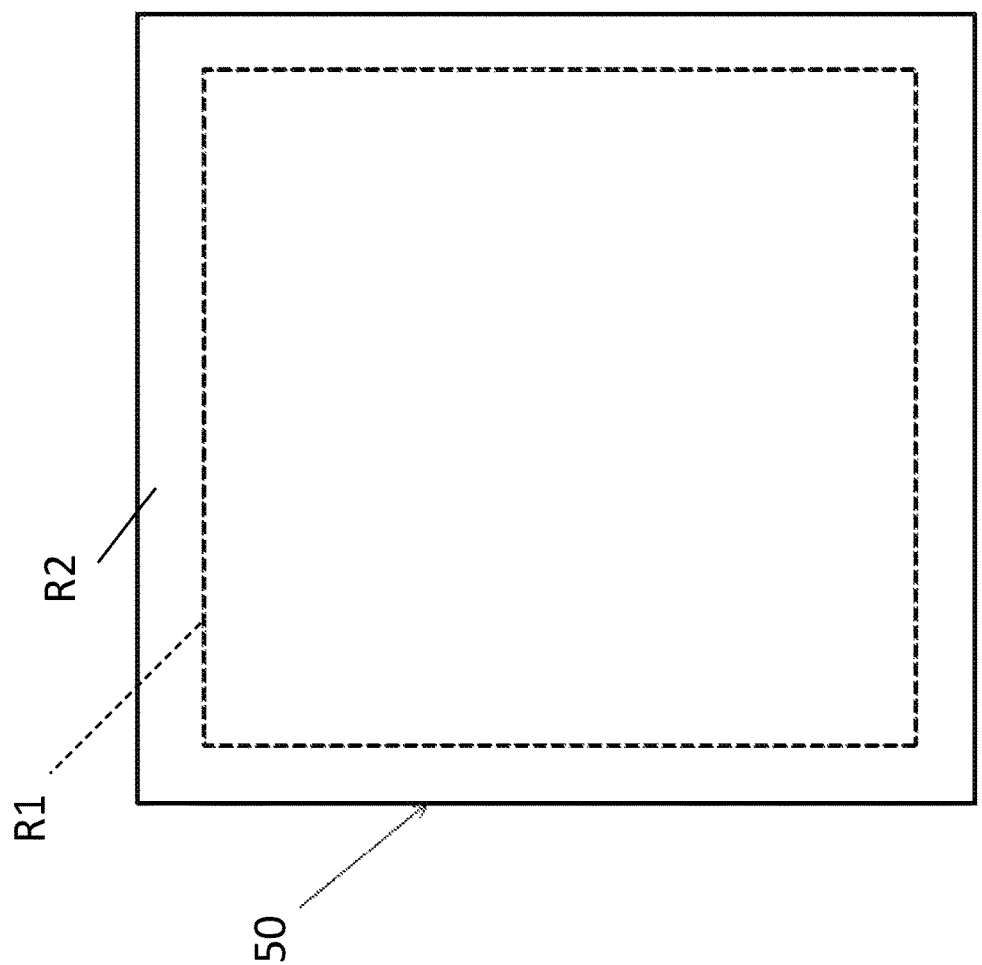
FIG. 13 is a schematic diagram showing a laser drilling area range defined in an embodiment of the present invention.
Figure 14:
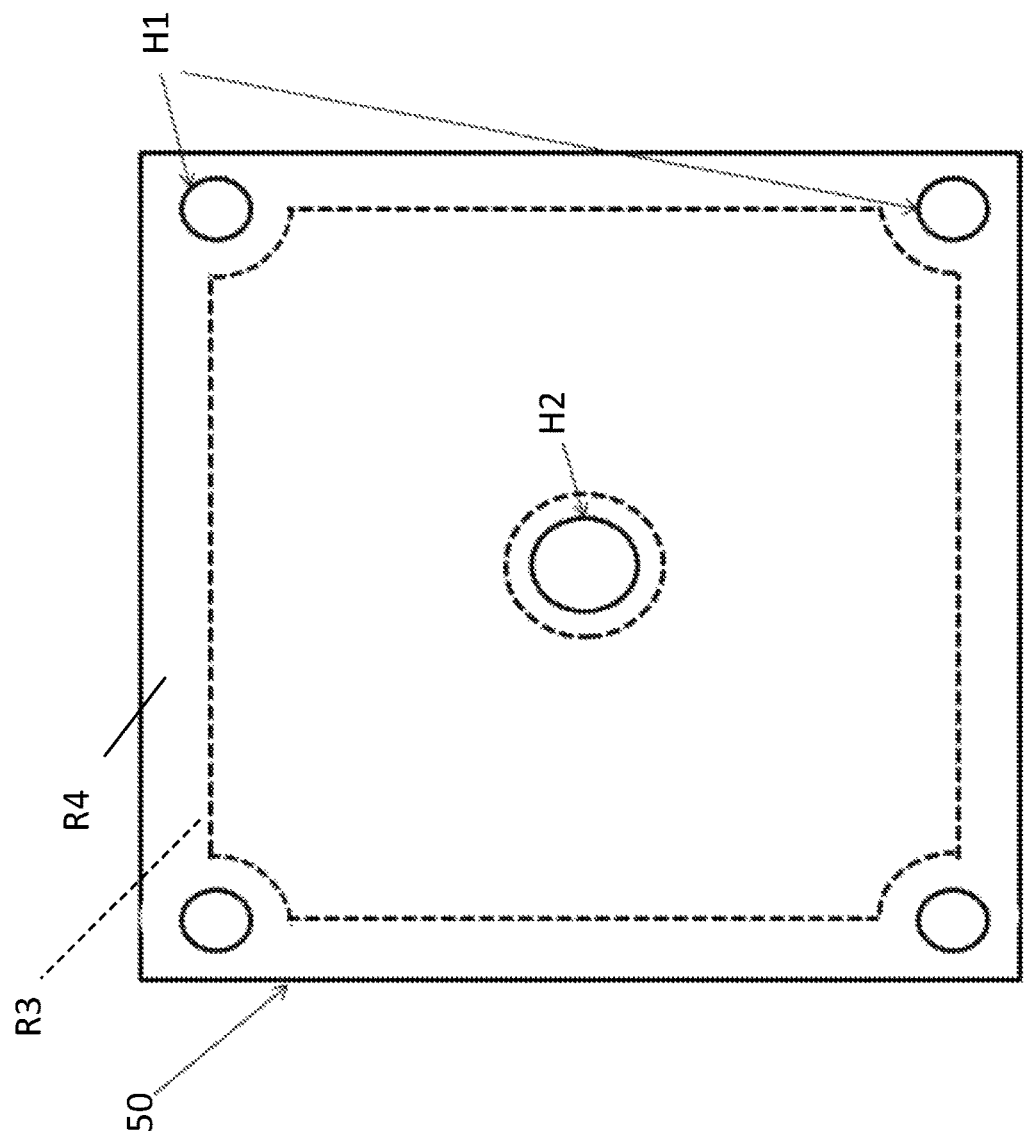
FIG. 14 is a schematic diagram showing a laser drilling area range defined in another embodiment of the present invention.

FIG. 13 is a schematic diagram showing a laser drilling area defined in an embodiment of the present invention. In FIG. 13, the metal-supported SOFC 50 has the substrate body with a perforated area R1 and an imperforated area R2. The perforated area R1 is the area including the plural first gas channels 112 and the plural second gas channels 232. In this embodiment, the perforated area R1 is the square area defined and enclosed by a dotted line, and thus the imperforated area R2 is the area provided for welding and sealing purposes of the SOFC 50. Generally, the perforated area R1 shown in FIG. 13 is only for illustration, and thus the present invention is not limited thereby. Although normally the plural first gas channels 112 and the plural second gas channels 232 are distributed into the same perforated area, they can be distributed into different perforated areas. Moreover, the shape of the perforated area can be varied. Please refer to FIG. 14, which is a schematic diagram showing a laser drilling area range defined in another embodiment of the present invention. In FIG. 14, the metal-supported SOFC 50 has the substrate body with a perforated area R3 and an imperforated area R4, in which the perforated area R3 is the area having two dotted lines shown in FIG. 14 as boundaries. The metal-supported SOFC 50 has four hydrogen entrances H1 at the four corners and one hydrogen exit H2 at the center thereof. Similarly, as shown in FIG. 14, the perforated area R3 is the area including the plural first gas channels 112 and the plural second gas channels 232, whereas the imperforated area R4 is the area provided for welding and sealing in the SOFC 50. In addition, the plural first gas channels 112 and the plural second gas channels 232 can be distributed into the same perforated area, or they can be distributed into different perforated areas.

After the step S31 in FIG. 12, the step S32 is proceeded. At the step S32, the thin substrate is welded to the thick substrate.

As shown in FIG. 3, in the present embodiment, first a layer 140 of nickel powders with sizes less than 10 μm or nickel-based paste containing nickel powers that have sizes smaller than 10 μm is coated to form a thin layer with a thickness less than 10 μm, and is sandwiched between the thin substrate 230 and the thick substrate 110, and then a high temperature brazing process is enabled either in the vacuum circumstance or in a reducing atmosphere at a temperature ranged from 800° C. to 1100° C. and under a pressure smaller than 60 tons for welding the thin substrate 230 to the thick substrate 100 so as to form a substrate body such as the substrate body 20 used in the permeable metal substrate 200 shown in FIG. 7. In other embodiments, the substrate body 30 as shown in FIG. 5 can be formed similarly by using the step S32 for welding the thin substrate 330 to the thick substrate 110.

After the step S32, the step S33 is proceeded. At the step S33, a permeable powder layer (porous) 260 is formed on the thin substrate of a substrate body by using high temperature sintering and pressing processes.

Comparing the step S33 in the FIG. 12 with the step S22 in FIG. 9, the step S33 is to form a permeable powder layer 260 on the thin substrate of substrate body and the step S22 is to form a permeable powder layer 260 on the thick substrate (substrate body), the forming method is the high temperature sintering and pressing processes, the permeable powder layer has metal particles with particle sizes ranged from 5 to 75 μm and a thickness ranged from 50 to 200 μm. Instead of using the above method, an atmospheric plasma spraying process can be applied to disposed the permeable powder layer 260 on the thin substrate of a substrate body, whereas the permeable powder layer 260 is a layer of metal particles with particle sizes ranged from 5 to 75 μm and in a thickness ranged from 50 to 200 μm.

It is noted that the permeable powder layer can be formed of metal particles with particle sizes ranged from 5 to 75 μm and the powder material is a material selected from the group consisting of: nickel, a nickel-iron alloy and a nickel-cobalt alloy, and in a condition when the metal particles is made of a nickel-iron alloy, the weight ratio of iron in such nickel-iron alloy should be about 10~50 wt %.

In addition, by using an optical or electrical microscope to observe the surface of the permeable powder layer 260 for determining whether there are surface pores with sizes larger than 30 μm; and if not, an atmospheric plasma spraying process is enabled for manufacturing functional layers of a SOFC.

However, if there are surface pores with sizes larger than 30 μm, the flow is enabled to proceed to the step S24 for reducing the surface pore sizes of the permeable powder layer to be smaller than 30 μm.

After the step S24, the step S25 is proceeded. At the step S25, any protrusion on a substrate is pressed and flattened so as to form the permeable metal substrate. It is noted the process enabled in the step S25 can enhance the binding force between particles in the permeable powder layer 260, while also can enhance the binding force between the permeable powder layer and the substrate body, by that the overall mechanical strength of the permeable metal substrate 100 is increased.

After the step S25, the step S26 is proceeded. At the step S26, an atmospheric plasma spraying process is enabled to sequentially form a porous anode layer 52, a dense anode isolation layer 53, a dense electrolyte layer 54, a dense cathode isolation layer 55 and a porous cathode layer 56 on the permeable metal substrate 200 so as to achieve a metal-supported SOFC 50 as the one shown in FIG. 8.

Figure 15:
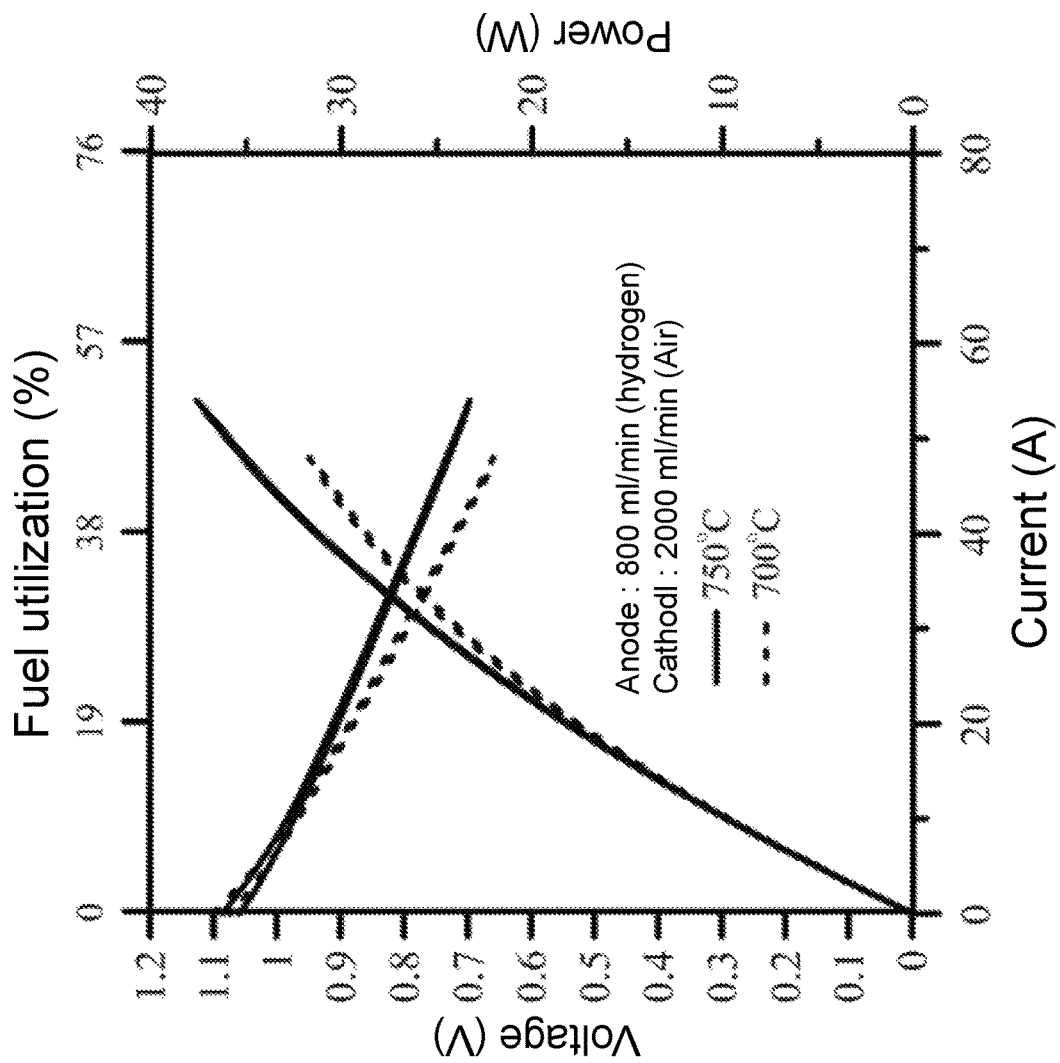
FIG. 15 is a diagram showing the electric performances of a metal-supported SOFC of the present invention under 700° C. and 750° C.

Please refer to FIG. 15, which is a diagram showing the electric performances of a metal-supported SOFC of the present invention under 700° C. and 750° C. In FIG. 15, a 10×10 cm² metal-supported SOFC is used for example, in which a Crofer 22H plate of 1 mm in thickness is used as the thick substrate and another Crofer 22H plate of 0.2 mm in thickness is used as the thin substrate, while both the thick substrate and the thin substrate have the square perforated areas such as those shown in FIG. 13 and thus the SOFC is structured as the one shown in FIG. 8.

In this embodiment, the perforated area in the thick substrate is a 8 cm×8 cm square area, in which there are 2500 straight through-holes acting as the first gas channels to be formed, while allowing each straight through-hole to be formed with a diameter of 1.2 mm and any two neighboring through-holes to be spaced from each other at a distance of 1.6 mm from the centers thereof. Moreover, the perforation density is 39 holes/cm², and the percentage of perforated area to the area of the thick substrate before being perforated is about 44%.

In addition, the perforated area in the thin substrate is a 9 cm×9 cm square area, in which there are 119716 straight through-holes acting as the second gas channels to be formed, while allowing each straight through-hole to be formed with a diameter of 0.12 mm and any two neighboring through-holes to be spaced from each other at a distance of 0.26 mm from the centers thereof. Moreover, the perforation density is 1478 holes/cm², and the percentage of perforated area to the area of the thin substrate before being perforated is about 17%.

After perforating the thick substrate and the thin substrate, forming the corresponding substrate body and permeable powder layer, the steps for forming functional layers of the SOFC by using an atmospheric plasma spraying process can be enabled, the details are given as those shown in FIG. 9 and FIG. 12. Thereafter, the step 26 is proceeded for completing the SOFC manufacturing.

In FIG. 15, the metal-supported SOFC is tested in the conditions that the working temperatures are set at 700° C. and 750° C., the air flow through the cathode is set at 2000 ml/min and the hydrogen flow at the anode is set at 800 ml/min. With increasing current density, the output power density is increased correspondingly while the output voltage decreases. As shown in FIG. 15, when the working temperature is 750° C. and the current density is 50 A, the corresponding output power is about 36 W. However, when the working temperature is 700° C. and the current density is 50 A, the corresponding output power is about 32.5 W. Obviously, the metal-supported SOFC of the present embodiment has attractive performances.

It is noted that the fuel utilization ratio is referred to the percentage of hydrogen consumed to generate electricity per minute to the input hydrogen flow at 800 ml/min.

Figure 16:
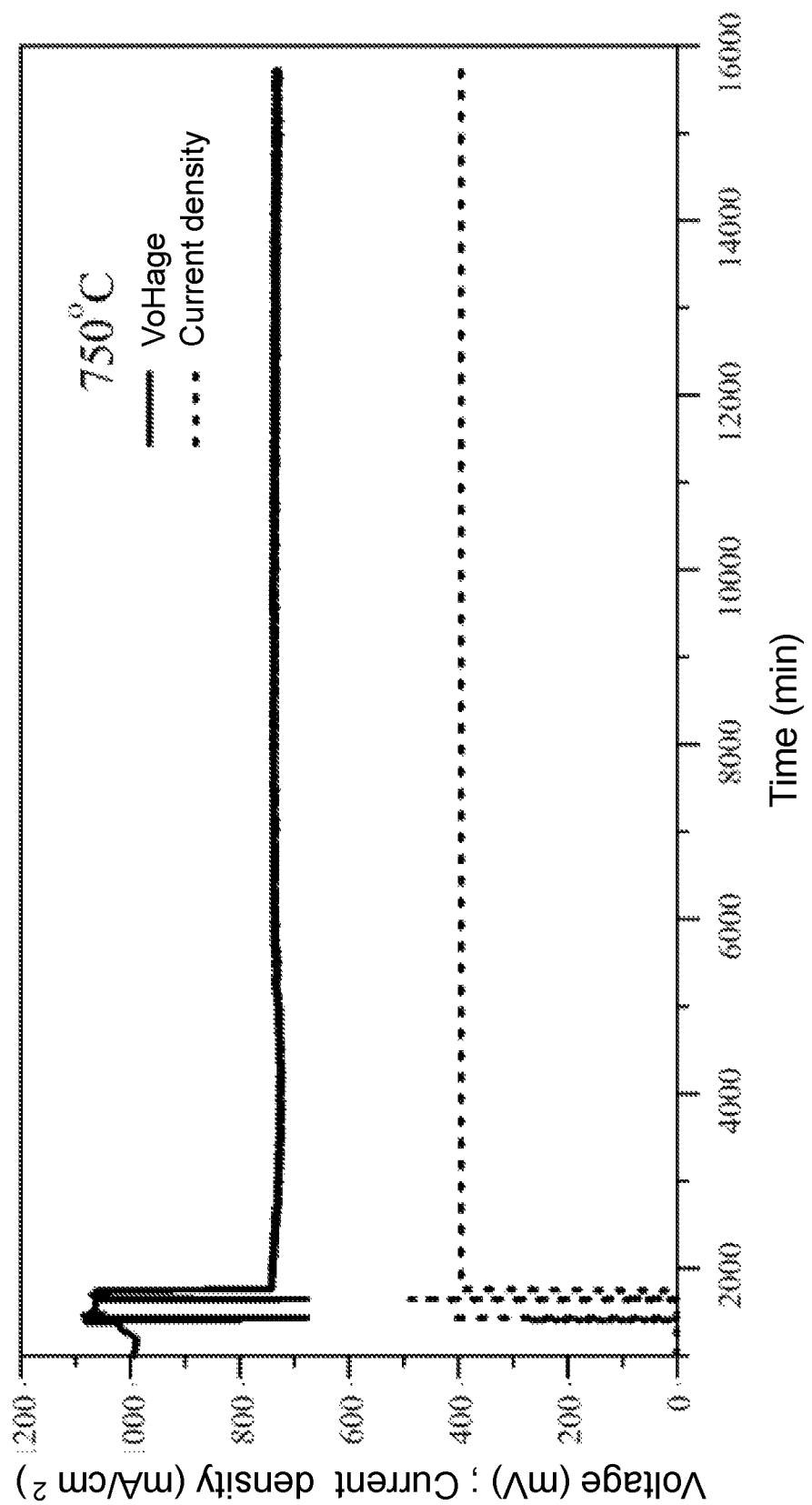
FIG. 16 is a diagram showing the long-term electric performance stability of a metal-supported SOFC of the present invention under 750° C. and 400 mA/cm$^2$ in a single cell test.

Please refer to FIG. 16, it is a diagram showing the long-term electric performance stability of a metal-supported SOFC of the present invention under 750° C. and 400 mA/cm². In FIG. 16, the voltage of the SOFC is observed when the working temperature is set at 750° C. and the constant current density is set at 400 mA/cm², and the observation shows that the voltage of the SOFC has no significant decay in a long period of time. Therefore, the SOFC has a satisfactory stability of electrical performance.

To sum up, the performances of the metal-supported SOFC given in the present invention show the so-achieved permeable metal substrate with a plurality of straight permeable gas channels is beneficially for the transmission of water vapor and hydrogen.

Moreover, when the substrate body used in the SOFC is substantially a metallic interconnect, there will be a thin layer containing $Cr_2O_3$ and spinel such as Mn—Cr spinel formed on the surface of the substrate body as it is being oxidized. Thus, this layer can be used for preventing the interior of the thick substrate 110 from further oxidization, and also since the layer of $Cr_2O_3$ and spinel can maintain a satisfactory conductivity in the working temperature, ohmic losses can be minimized.

In addition, by adopting the aforesaid permeable metal substrate in a metal-supported SOFC, the efficiency for guiding hydrogen to flow entering the anode layer, and draining water vapor byproduct out of the anode layer can be enhanced. In addition, as the permeable metal substrate is advantageous by its abilities to resist oxidization, impact and thermal shock, in addition to giving a satisfactory mechanical strength, the deformation of the permeable metal substrate occurred when it is used in a low-cost rapid coating atmospheric plasma spraying process for manufacturing a cell can be well minimized within an acceptable range. Moreover, since the metal-supported SOFC of the present invention is formed with a first anode layer with micron and sub-micron structures that is made of YSZ-NiO, the whole anode strength in the resulting SOFC can be enhanced by the stronger binding strength between YSZ powders as compared to the binding strength between LDC powders.

In the present invention, either by adjusting the hole sizes of the gas channels or the distribution densities of the gas channels, the fuel distribution at the anode of a SOFC can be more uniformed. That is, the hole sizes or the distribution densities of the gas channels are increased along directions that are parallel and perpendicular to the fuel flowing direction. Without the aforesaid design, the averaged fuel density in each of the gas channels decreases naturally along directions that are parallel and perpendicular to the fuel flowing direction due to the fuel exhaustion and expansion, therefore the fuels at different positions of the anode of a SOFC along those directions decreases, and hence, by increasing the hole sizes or the distribution densities of the gas channels, the averaged fuel density at different positions of SOFC anode can be maintained more even so that the gradient of power density of a SOFC along directions that are parallel and perpendicular to the fuel flowing direction can be minimized and also the temperature gradient resulted from the power density gradient can be minimized too, i.e. the power density and temperature in the metal-supported SOFC are more uniformly distributed. Therefore, by either increasing the hole sizes of the first and the second gas channels, or increasing their distribution density, the fuel distribution in the anode of a SOFC can be more uniformed and thus the lifespan of the SOFC can be increased.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A metal-supported solid oxide fuel cell, comprising:
   a permeable metal substrate, further comprising a substrate body and a permeable powder layer, wherein:
   the substrate body is substantially a metallic interconnect that is perforated by a drilling process and is formed with a plurality of gas channels; and the permeable powder layer is disposed on the substrate body;
   a porous anode layer, disposed on the permeable powder layer of the permeable metal substrate;
   a dense anode isolation layer, disposed on the porous anode layer;
   a dense electrolyte layer, disposed on the dense anode isolation layer;
   a dense cathode isolation layer, disposed on the dense electrolyte layer; and
   a porous cathode layer, disposed on the dense cathode isolation layer.

2. The metal-supported solid oxide fuel cell of claim 1, wherein the porous anode layer is composed of a first anode layer and a second anode layer in a manner that the second anode layer is sandwiched between the first anode layer and the dense anode isolation layer; the first anode layer is disposed on the permeable powder layer of the permeable metal substrate; the second anode layer is a nano-sized structure; the first anode layer is a micron-sized structure or a submicron-sized structure; the first anode layer with the micron-sized or submicron-sized structure is substantially a YSZ-NiO layer that is formed by mixing a material of YSZ and a material of NiO uniformly in a weight ratio of 40:60, 50:50 or 60:40, while the particle sizes of the YSZ material and the NiO material are micron-scaled or submicron-scaled; and the second anode layer with the nano-sized structure is substantially a LDC-NiO layer that is formed by mixing a material of LDC and a material of NiO uniformly in a weight ratio of 40:60, 50:50 or 60:40, while the particle sizes of the LDC material and the NiO material are nano-scaled.

3. The metal-supported solid oxide fuel cell of claim 1, wherein the dense anode isolation layer is substantially a SDC layer or an LDC layer, while SDC particles or the LDC particles that are used for manufacturing the dense anode isolation layer are nano-scaled particles.

4. The metal-supported solid oxide fuel cell of claim 1, wherein the dense electrolyte layer is an LSGM layer or a layer formed by a mixture of LSGM (10~20 wt %) and LDC (80~90 wt %), the dense electrolyte layer is an airtight structure.

5. The metal-supported solid oxide fuel cell of claim 1, wherein the dense cathode isolation layer is substantially a SDC layer or an LDC layer, while SDC particles or the LDC particles that are used for manufacturing the dense cathode isolation layer are nano-scaled particles.

6. The metal-supported solid oxide fuel cell of claim 1, wherein the porous cathode layer is composed of a cathode interlayer and a cathode current collecting layer in a manner that the cathode interlayer is sandwiched between the cathode current collecting layer and the dense cathode isolation layer; the cathode interlayer is a layer selected from the group consisting of: a LDC-LSCo layer, a LDC-LSCF layer, a LDC-SSC layer, a SDC-LSCo layer, a SDC-LSCF layer and a SDC-SSC layer, and the weight ratio of LDC or SDC to LSCo or LSCF or SSC is 40:60, 50:50 or 60:40, while the particle size of the LDC or SDC material is nano-scaled, and the particle size of the LSCo or LSCF or SSC material is submicron-scaled; and the cathode current collecting layer is a layer selected from the group consisting of: a LSCo layer, a LSCF layer, and a SSC layer, while the particle size of the LSCo or LSCF or SSC material is submicron-scaled.

7. The metal-supported solid oxide fuel cell of claim 1, wherein the substrate body is formed of a thick substrate or a laminate consisting of a thick substrate and a thin substrate that are welded together by a high temperature brazing process, while the thickness of the thick substrate is ranged from 0.5 to 1.5 mm, the thickness of the thin substrate is ranged from 0.1 to 0.2 mm, and both the area sizes of the thick substrate and the thin substrate are ranged from 5×5 cm² to 20×20 cm²; when the substrate body is formed of the thick substrate, the plural gas channels formed in the thick substrate is substantially a plurality of permeable straight first gas channels, and when the substrate body is formed of the laminate consisting of the thick substrate and the thin substrate, the plural gas channels includes a plurality of permeable straight first gas channels formed in the thick substrate and a plurality of permeable straight second gas channels formed in the thin substrate, while allowing each of the first gas channels and the second channels to be formed in a shape selected from the group consisting of: a column, a pentagonal prism, hexagonal prism and an octagonal prism, and enabling each of first gas channels to be formed with a hole size ranged from 0.3 to 1.5 mm, and each of the second gas channels to be formed with a hole size ranged from 0.08 to 0.15 mm.

8. The metal-supported solid oxide fuel cell of claim 1, wherein the drilling process is a process selected from the group consisting of: a laser drilling process, a mechanical drilling process and the combination of the two; and the hole sizes or the distribution densities of the first or the second gas channels are maintained unchanged or increasing along directions that are parallel and perpendicular to a fuel flowing direction.

9. The metal-supported solid oxide fuel cell of claim 1, wherein the metallic interconnect is formed of a chromium-containing ferritic stainless steel, and the chromium-containing ferritic stainless steel contains Crofer 22 and ZMG232.

10. The metal-supported solid oxide fuel cell of claim 1, wherein the permeable powder layer has surface pores smaller than 30 μm, while the permeable powder layer is formed of a powder material with particle sizes ranged from 5 to 75 μm; and the powder material is a material selected from the group consisting of: nickel, a nickel-iron alloy and a nickel-cobalt alloy; and the thickness of the permeable powder layer is ranged from 50 to 200 μm.

11. A method for manufacturing a metal-supported solid oxide fuel cell, comprising the steps of:
providing a substrate body;
forming a plurality of gas channels on the substrate body by using a drilling process;
forming a permeable powder layer on the substrate body by using further steps of: forming a green layer of permeable powder layer by a tape caster, sintering the green layer into a permeable powder layer by using a high temperature sintering process, disposing the sintered permeable powder layer onto the substrate body and making them laminated and connected together by using high temperature pressing process;
reducing the surface pore sizes of the permeable powder layer to be smaller than 30 μm;
using a high temperature pressing process to flatten a permeable metal substrate; and
using an atmospheric plasma spraying process to sequentially form a porous anode layer, a dense anode isolation layer, a dense electrolyte layer, a dense cathode isolation layer and a porous cathode layer on the permeable metal substrate.

12. The method of claim 11, wherein the porous anode layer is composed of a first anode layer and a second anode layer in a manner that the second anode layer is sandwiched between the first anode layer and the dense anode isolation layer; the first anode layer is disposed on the permeable powder layer of the permeable metal substrate; the second anode layer is a nano-sized structure; the first anode layer is a micron-sized structure or a submicron-sized structure; the first anode layer with the micron-sized or submicron-sized structure is substantially a YSZ-NiO layer that is formed by mixing a material of YSZ and a material of NiO uniformly in a weight ratio of 40:60, 50:50 or 60:40, while the particle sizes of the YSZ material and the NiO material are micron-scaled or submicron-scaled; and the second anode layer with the nano-sized structure is substantially a LDC-NiO layer that is formed by mixing a material of LDC and a material of NiO uniformly in a weight ratio of 40:60, 50:50 or 60:40, while the particle sizes of the LDC material and the NiO material are nano-scaled.

13. The method of claim 11, wherein the dense anode isolation layer is substantially a SDC layer or an LDC layer, while SDC particles or the LDC particles that are used for manufacturing the dense anode isolation layer are nano-scaled particles.

14. The method of claim 11, wherein the dense electrolyte layer is substantially an LSGM layer or a layer formed by a mixture of LSGM (10~20 wt %) and LDC (80~90 wt %), the dense electrolyte layer is an airtight structure.

15. The method of claim 11, wherein the dense cathode isolation layer is substantially a SDC layer or an LDC layer, while SDC particles or the LDC particles that are used for manufacturing the dense cathode isolation layer are nano-scaled particles.

16. The method of claim 11, wherein the porous cathode layer is composed of a cathode interlayer and a cathode current collecting layer in a manner that the cathode interlayer is sandwiched between the cathode current collecting layer and the dense cathode isolation layer; the cathode interlayer is a layer selected from the group consisting of: a LDC-LSCo layer, a LDC-LSCF layer, a LDC-SSC layer, a SDC-LSCo layer, a SDC-LSCF layer and a SDC-SSC layer, and the weight ratio of LDC or SDC to LSCo or LSCF or SSC is 40:60, 50:50 or 60:40, while the particle size of the LDC or SDC material is nano-scaled, and the particle size of the LSCo or LSCF or SSC material is submicron-scaled; and the cathode current collecting layer is a layer selected from the group consisting of: a LSCo layer, a LSCF layer, and a SSC layer, while the particle size of the LSCo or LSCF or SSC material is submicron-scaled.

17. The method of claim 11, wherein the high temperature pressing process to flatten the permeable metal substrate is performed either in the vacuum circumstance or in a reducing atmosphere at a temperature ranged from 800° C. to 1100° C. and under a pressure ranged from 10 kg/cm² to 100 kg/cm².

18. The method of claim 11, wherein in a condition when the substrate body is a laminate consisting of a thick substrate and a thin substrate, the method further comprises the steps of:
enabling a high temperature brazing process for welding the thin substrate to the thick substrate, and the high temperature brazing process is defined to perform the welding either in the vacuum circumstance or in a reducing atmosphere at a temperature ranged from 800° C. to 1100° C. and under a pressure smaller than 60 tons.

19. The method of claim 11, wherein the drilling process is a process selected from the group consisting of: a laser drilling process, a mechanical drilling process and the combination of the two; and the hole sizes or the distribution densities of the first or the second gas channels are maintained unchanged or increasing along directions that are parallel and perpendicular to a fuel flowing direction.

20. The method of claim 11, wherein the high temperature sintering and pressing processes used for forming the permeable powder layer on the substrate body are:

the high temperature sintering process is either in the vacuum circumstance or in a reducing atmosphere at a temperature ranged from 800° C. to 1100° C.; and the high temperature pressing process is either in the vacuum circumstance or in a reducing atmosphere at a temperature ranged from 800° C. to 1100° C. under a pressure smaller than 30 tons for laminating and connecting the permeable powder layer to the body substrate.

21. The method of claim 11, wherein the forming of the SOFC functional layers on the substrate body is performed by using an atmospheric plasma spraying process.

22. The method of claim 11, wherein the step for reducing the surface pore sizes of the permeable powder layer to be smaller than 30 μm further comprises the steps of:

forming an adhesive layer on the permeable powder layer;

paving selected metal powders on the adhesive layer, while allowing the particle sizes of the metal powders to be smaller than 45 μm, and allowing each particle of metal powders to be a nickel particle, a nickel-iron alloy particle or a nickel-cobalt alloy particle;

enabling the metal powders to be distributed uniformly; and sintering the metal powders to the permeable powder layer at a temperature ranged from 800° C. to 1100° C. until the surface pore sizes of the permeable powder layer to be smaller than 30 μm.

23. The method of claim 11, wherein the forming of the permeable powder layer on the substrate body is:

to form the permeable powder layer on a thick substrate in a condition that the substrate body is the thick substrate; or to form the permeable powder layer on a thin substrate in a condition that the substrate body is formed of the thin and thick substrates.

* * * * *